(12) United States Patent
Alashkin et al.

(10) Patent No.: US 11,973,687 B2
(45) Date of Patent: Apr. 30, 2024

(54) MULTILAYER DECENTRALIZED SERVER NETWORK

(71) Applicant: Aloha Mobile Ltd., Limassol (CY)

(72) Inventors: Alexander Alashkin, Limassol (CY); Andrey Moroz, Limassol (CY); Vladimir Goncharov, Limassol (CY)

(73) Assignee: Aloha Mobile Ltd., Limassol (CY)

(*) Notice: Subject to any disclaimer, the term of this patent is extended or adjusted under 35 U.S.C. 154(b) by 0 days.

(21) Appl. No.: 17/342,850

(22) Filed: Jun. 9, 2021

(65) Prior Publication Data
US 2021/0392075 A1    Dec. 16, 2021

(30) Foreign Application Priority Data
Jun. 11, 2020   (EP) .................................. 20390002

(51) Int. Cl.
*H04L 45/74*     (2022.01)
*H04L 41/0604*   (2022.01)
(Continued)

(52) U.S. Cl.
CPC .......... *H04L 45/74* (2013.01); *H04L 41/0627* (2013.01); *H04L 41/0654* (2013.01); *H04L 45/28* (2013.01); *H04L 67/01* (2022.05)

(58) Field of Classification Search
CPC . H04L 63/0428; H04L 63/0407; H04L 63/04; H04L 45/02; H04L 45/24;
(Continued)

(56) References Cited

U.S. PATENT DOCUMENTS 9,438,564 B1 *  9/2016  Weng ................... H04L 63/0272
10,594,746 B1 *  3/2020  VanderKnyff .......... H04L 45/74
(Continued)

OTHER PUBLICATIONS

F. Baker and P. Rose, Quality of Service (QOS) Signaling in a Nested Virtual Private Network (RFC4923), copyright 2007. An IP.com Prior Art Database Technical Disclosure, IP.com No. IPCOM000157119D, IP.com Electronic Publication Date: Feb. 15, 2019, 39 pages. (Year: 2019).*

(Continued)

*Primary Examiner* — Patrice L Winder
(74) *Attorney, Agent, or Firm* — RMCK Law Group PLC

(57) ABSTRACT

A system includes masking servers, transport servers, and signal servers. Each transport server stores masking server Internet Protocol (IP) addresses. Each signal server is configured to store transport server IP addresses, receive an update request from a client, and send the transport server IP addresses to the client in response to the update request. Each transport server is configured to receive a request data payload for a destination target server from the client, select a masking server, and send the request data payload to the selected masking server. The selected masking server is configured to send the request data payload to the target server, receive a response data payload from the target server, and send the response data payload to the transport server from which the request data payload was received. The transport server that receives the response data payload sends the response data payload to the client.

34 Claims, 18 Drawing Sheets

(51) Int. Cl.
*H04L 41/0654* (2022.01)
*H04L 45/28* (2022.01)
*H04L 67/01* (2022.01)

(58) Field of Classification Search
CPC ..... H04L 45/22; H04L 45/74; H04L 41/0627; H04L 41/0654; H04L 45/28; H04L 67/42; H04L 67/1002; H04L 67/1038; H04L 67/18; H04L 67/32; H04L 67/28
See application file for complete search history.

(56) References Cited

U.S. PATENT DOCUMENTS

| | | | | |
|---|---|---|---|---|
| 10,601,779 | B1* | 3/2020 | Matthews | H04L 67/141 |
| 2003/0182443 | A1* | 9/2003 | Wang | H04L 67/02 |
| | | | | 705/76 |
| 2005/0038898 | A1 | 2/2005 | Mittig et al. | |
| 2008/0196098 | A1 | 8/2008 | Cottrell et al. | |
| 2014/0223170 | A1* | 8/2014 | Reynolds | H04L 45/24 |
| | | | | 713/153 |
| 2016/0087941 | A1* | 3/2016 | Mudigonda | H04L 12/4641 |
| | | | | 726/12 |
| 2016/0371508 | A1* | 12/2016 | McCorkendale | H04L 63/0272 |
| 2017/0034129 | A1* | 2/2017 | Sawant | H04L 63/0272 |
| 2019/0081930 | A1* | 3/2019 | Hunt, IV | H04L 63/0272 |
| 2019/0132292 | A1* | 5/2019 | Reimer | H04L 45/64 |

OTHER PUBLICATIONS

R. A. Haraty and B. Zantout, "The TOR data communication system: A survey," 2014 IEEE Symposium on Computers and Communications (ISCC), Funchal, Portugal, 2014, pp. 1-6, doi: 10.1109/ISCC.2014.6912635. (Year: 2014).*
Extended European Search Report dated Oct. 7, 2020 for EP Application No. 20390002.2, 9 pages.
Tor Project: Overview, https://web.archive.org/web/20200608165648/ https://2019.www.torproject.org/about/overview.html.en, Jun. 8, 2020, Retrieved from the Internet on Sep. 28, 2020, 3 pages.

* cited by examiner

MULTILAYER DECENTRALIZED SERVER NETWORK

CROSS-REFERENCE TO RELATED APPLICATIONS

This application claims priority to European Patent Application No. 20390002.2, filed on Jun. 11, 2020. The disclosure of the above application is hereby incorporated by reference in its entirety.

FIELD

The present disclosure relates to decentralized server networks.

BACKGROUND

Computer networks include a plurality of network nodes (e.g. computing devices) that communicate with one another. In some implementations, computer network nodes can route data between a requesting client device and a target server device. Example applications that use the client-server model can include, but are not limited to, web applications, email applications, digital video/audio applications, cloud storage applications, and communication applications. In some implementations, application-specific protocols can be layered (e.g., carried as a payload) over other more general communications protocols. Various technologies can be implemented to provide users with privacy and security when communicating over a computing network. For example, some computing devices may communicate with one another over an established virtual private network. As another example, some computing devices may communicate over a Tor network including a plurality of relays.

SUMMARY

In one example, a system comprises a plurality of masking servers, a plurality of transport servers, and a plurality of signal servers. Each of the transport servers is configured to store a masking server list that includes masking server Internet Protocol (IP) addresses for the plurality of masking servers. Each of the signal servers is configured to store a transport server list that includes transport server IP addresses for the plurality of transport servers, receive an update request from a client device, and send the transport server IP addresses to the client device in response to the update request. Each transport server is configured to receive a request data payload for a destination target server from the client device, select a masking server from the masking server list, and send the request data payload to the selected masking server. The selected masking server is configured to send the request data payload to the target server, receive a response data payload from the target server, and send the response data payload to the transport server from which the request data payload was received. The transport server that receives the response data payload is configured to send the response data payload to the client device.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
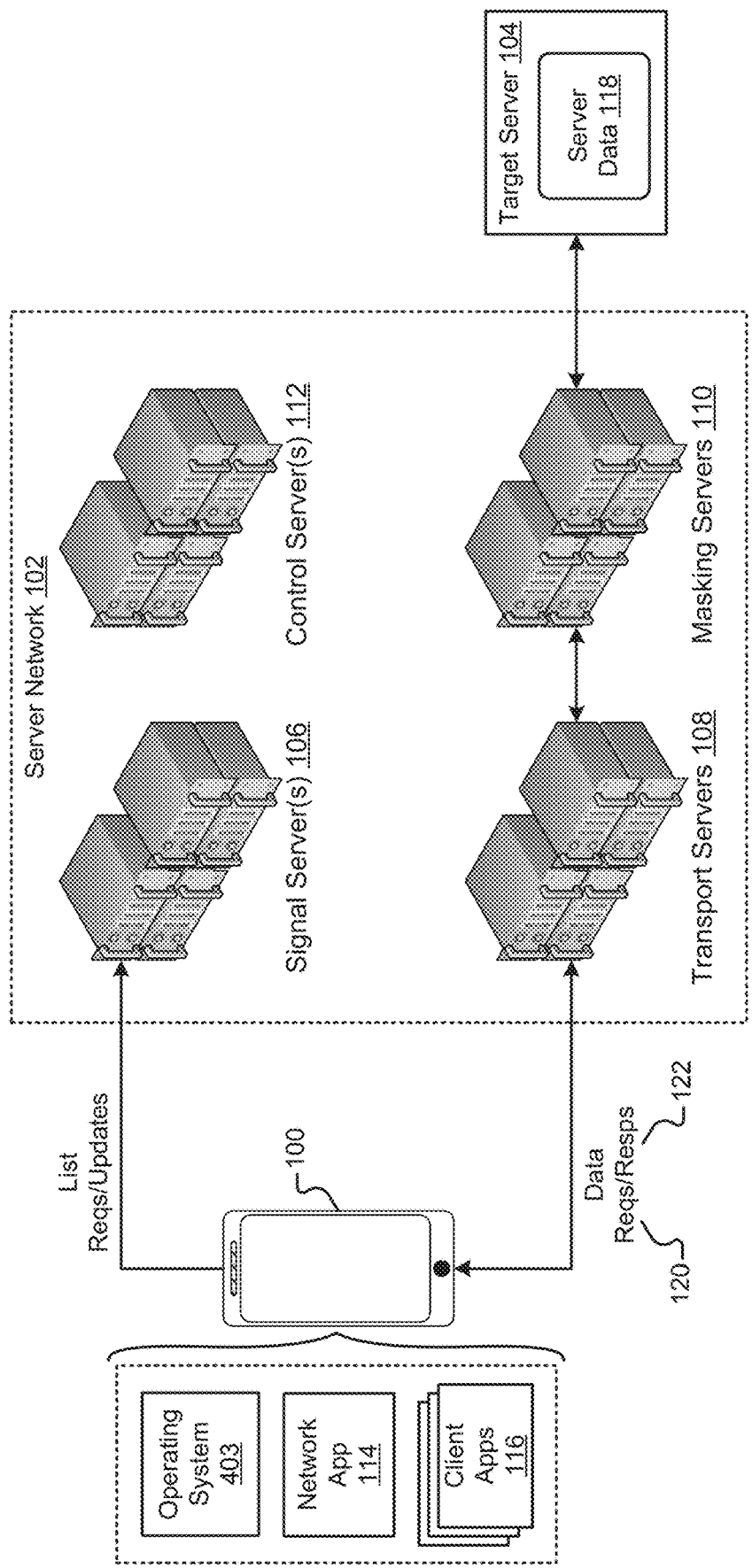
FIG. 1 illustrates an environment that includes a client computing device in communication with a server computing network and a target server.

FIG. 1 illustrates an environment that includes a client computing device 100 (hereinafter "client device 100") in communication with a server computing network 102 (hereinafter "server network 102") and a target server 104. Client devices 100 include, but are not limited to, smart phones, tablet computers, laptop computers, and desktop computers. The server network 102 includes a plurality of server computing devices (hereinafter "servers"), such as one or more signal servers 106, transport servers 108, masking servers 110, and one or more control servers 112. The naming of the servers herein as signal servers, transport servers, masking servers, and control servers are meant to differentiate the functionality of the servers, but do not necessarily indicate the type or location of the server. Although a single client device 100 is illustrated in FIG. 1, the server network 102 can communicate with a plurality of client devices.

The client device 100 (e.g., a user device) includes a network application 114 that the client device 100 can execute to communicate with the server network 102. Other applications 116 installed on the client device 100 (referred to herein as "client applications 116") can communicate with the server network 102 via the network application 114 (e.g., see FIG. 4A). For example, client applications 116 may send requests for the target server 104 to the network application 114. The network application 114 can then retrieve a response from the target server 104 and provide the response to the requesting client application. In some implementations, the functionality attributed to the stand-alone network application 114 can be included within other applications as a network module 400 (e.g., see FIG. 4B). For example, a web browser application may include a network module 400 that can communicate with target web servers via the server network 102. In some implementations, the network application/module can generate a graphical user interface (GUI) used to connect/disconnect from the server network 102. For example, the network application/module may generate a user-selectable GUI element (e.g., a button) that the user can select in order to connect to the server network 102 or disconnect from the server network 102.

As described herein, the network application 114 may retrieve a list of potential transport servers 108 from a signal server 106, and then communicate with the target server 104 via one or more of the listed transport servers 108 and one or more masking servers 110. The target server 104 represents a general server that provides server data 118 to the client device 100. For example, the target server 104 may include, but is not limited to, a database server, a file server, a web server, a mail server, an application server, and an application programming interface (API) server.

Each of the servers 106, 108, 110, 112 in the server network 102 can have a unique Internet Protocol (IP) address that identifies the server on the server network 102. The servers 106, 108, 110, 112 of FIG. 1 may be implemented in a variety of manners. For example, the servers 106, 108, 110, 112 may be physical servers and/or virtual servers, which may be located at the same geographical location or separated from one another. The client device 100, servers 106, 108, 110, 112, and target server 104 may be connected to each other via a computer network, such as the Internet. As such, the client device 100, servers 106, 108, 110, 112, and target server 104 may be connected via wired/wireless network hardware (e.g., wireless transceivers, routers, switches, etc.), although the connections are not illustrated in FIG. 1.

In some implementations, the server network 102 may be controlled by a single party that may own and/or operate the server network 102. The single party may be referred to herein as the "network administrator." The network administrator can use the control server 112 to configure the signal servers 106, transport servers 108, and masking servers 110 (e.g., see FIGS. 2-3). Each signal server 106 can store a list of IP addresses for the transport servers 108. Each signal server 106 can also store a list of IP addresses for other signal servers 106. The signal servers 106 may update their respective lists based on reports/updates received from client devices 100 and other signal servers 106.

The transport servers 108 and masking servers 110 provide a route for communication between the client device 100 and the target server 104. In order for the client device 100 to communicate with a target server 104, the client device 100 may initially retrieve a list of available transport servers 108 from a signal server 106. The client device 100 can then connect to an available transport server 108. The transport server 108 may then connect to one of the masking servers 110 that in turn connects to the target server 104. In this scenario, the client device 100 can make a data request to the target server 104 via the selected transport server 108 and the selected masking server 110. In response to the data request, the target server 104 may send a data response to the client device 100 via the selected masking server 110 and the selected transport server 108.

The connections between the various transport servers 108 and masking servers 110 can change over time (e.g., for different requests). For example, the client device 100 can select (e.g., randomly select) different transport servers 108 to use when communicating with the target server 104. As another example, a transport server 108 may select (e.g., randomly select) different masking servers 110 to use for communication with the target server 104. Accordingly, the client device 100 may communicate with the target server 104 via different server connections over time (e.g., see FIG. 12).

The data transmitted from the client device 100 to the target server 104 via the transport and masking servers may be referred to generally as a "data request 120." The data received at the client device 100 from the target server 104 may be referred to generally as a "data response 122." The data requests/responses 120, 122 may vary, depending on the type of target server 104. For example, the requests/responses 120, 122 may depend on the target server functionality and target server data. In one specific example, if the target server is a web server, the request may be a Hypertext Transfer Protocol (HTTP) request or an HTTP secure (HTTPS) request, such as a GET request. In this specific example, the response may include webpage content (e.g., text and/or one or more images) for display by a web browser.

In some implementations, communications with and within the server network 102 may be encrypted. For example, the communication between the client device 100 and transport/signal servers 108, 106 can be encrypted. The subsequent connection between the transport servers 108, masking servers 110, and target servers 104 may also be encrypted. In some examples, communications may be encrypted according to the Advanced Encryption Standard (AES) (e.g., AES 256).

As described herein, different types of servers may provide different functionality for the server network 102. The signal servers 106 may maintain current lists of available transport servers 108 and provide the lists to the client devices 100. A signal server 106 may learn about unavailable servers via communication with client devices 100 and other signal servers 106. In some implementations, the signal servers 106 may be unaware of the masking server IP addresses.

The transport servers 106 and masking servers 110 provide communication between the client device 100 and a target server 104. In some implementations, the transport servers 108 may not reveal the client device IP address to a masking server 110. Similarly, in some implementations, the masking server 110 may not reveal the transport server IP address to the target server 104. Accordingly, the masking server 110 and target server 104 may be unaware of the client device IP address.

Figure 15:
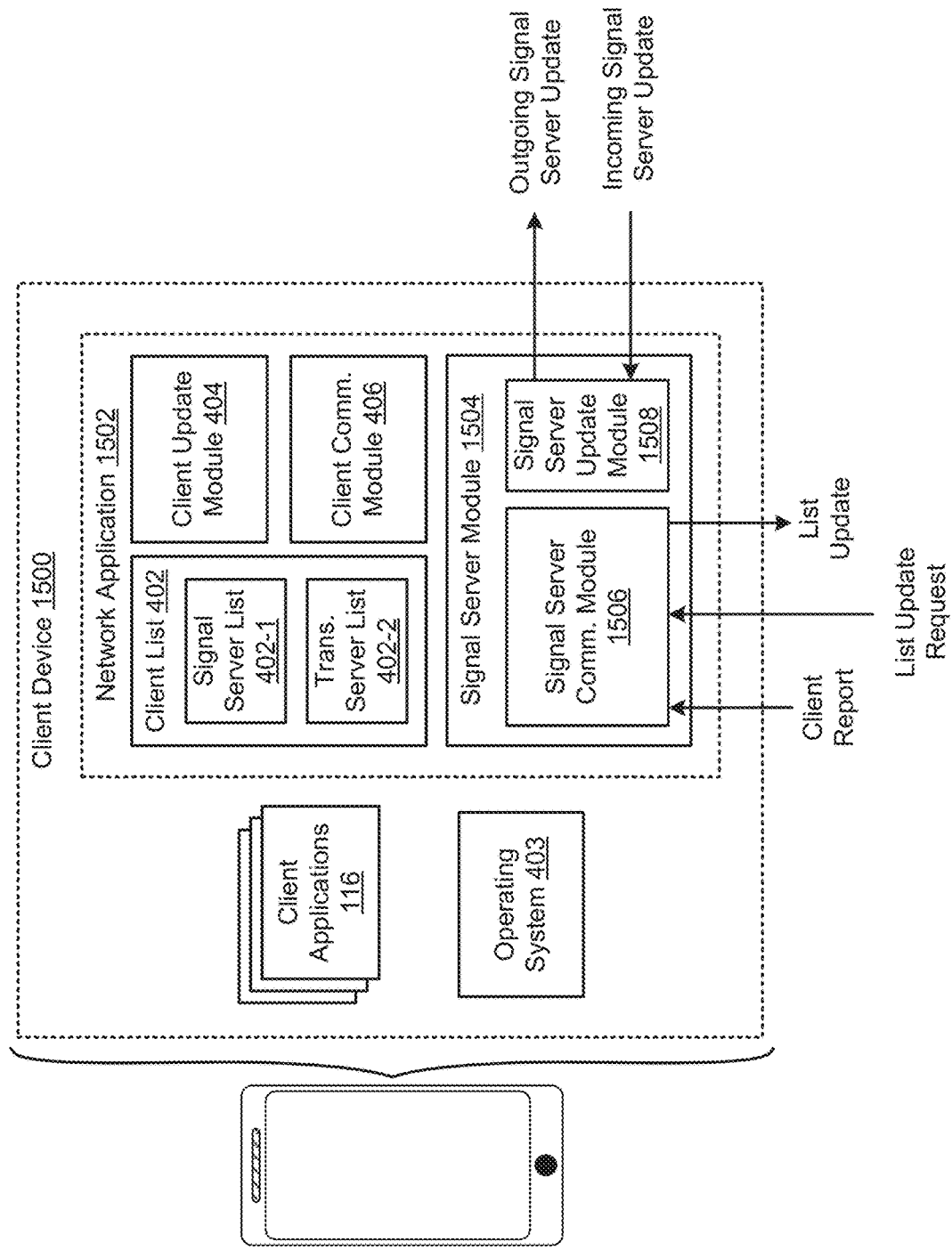
FIG. 15 is a functional block diagram that illustrates a client device that includes a signal server module.
Figure 16:
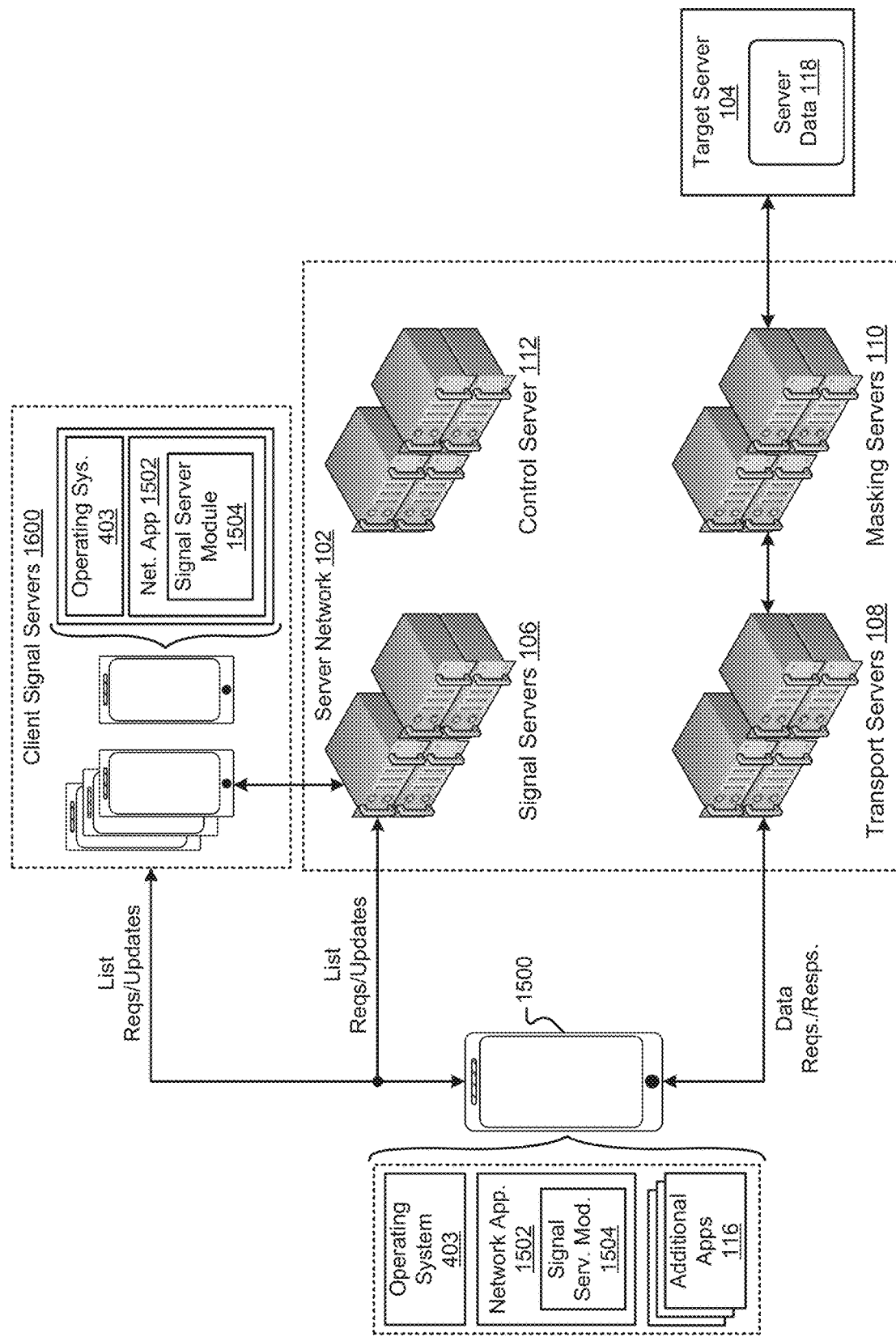
FIG. 16 is a functional block diagram that illustrates a server computing network and client signal servers.

In some implementations, signal server functionality may be implemented on client devices 100 (e.g., see FIGS. 15-16). For example, client devices 100 including the network application 114 may include modules for implementing the signal server functionality, such as storing lists of transport/signal servers, providing the lists to requesting devices, and updating the lists based on communication with other signal servers and client devices including the signal server functionality.

The multilayer server network 102 may provide private and secure communication for individual and enterprise applications. For example, the traffic in the server network 102 may be encrypted and indistinguishable from other HTTP/HTTPS web traffic. As another example, each node in the server network 102 may have only part of a user's identifying information, which may increase a user's privacy in the case one or more nodes are compromised. Furthermore, the communications may be protected from network blocks, attacks, and censorship. For example, the independent signal layer, which can change routes on the fly, can provide a stable and fast connection, even if the client is changing IP address during a session (e.g., between WiFi and mobile data).

In some cases, the server network 102 may be implemented by a single owner (e.g., a company) that controls the servers 106, 108, 110, 112 for use by client devices 100 (e.g., employee devices). In this case, the single owner may provide the network application 114 to the users and/or provide the network module software 400 to application developers for inclusion in the developer's applications. The single owner may then manage the server network 102 for the users (e.g., for free or in exchange for payment). In some cases, the single owner may also operate the target server 104 (e.g., as a company server for use by employee clients). Instead of a single owner/operator, the software for the servers 106, 108, 110, 112 and client device 100 may be distributed to multiple parties that implement different parts of the server network 102 and client software (e.g., the network application 114 and/or network module 400).

Figure 2:
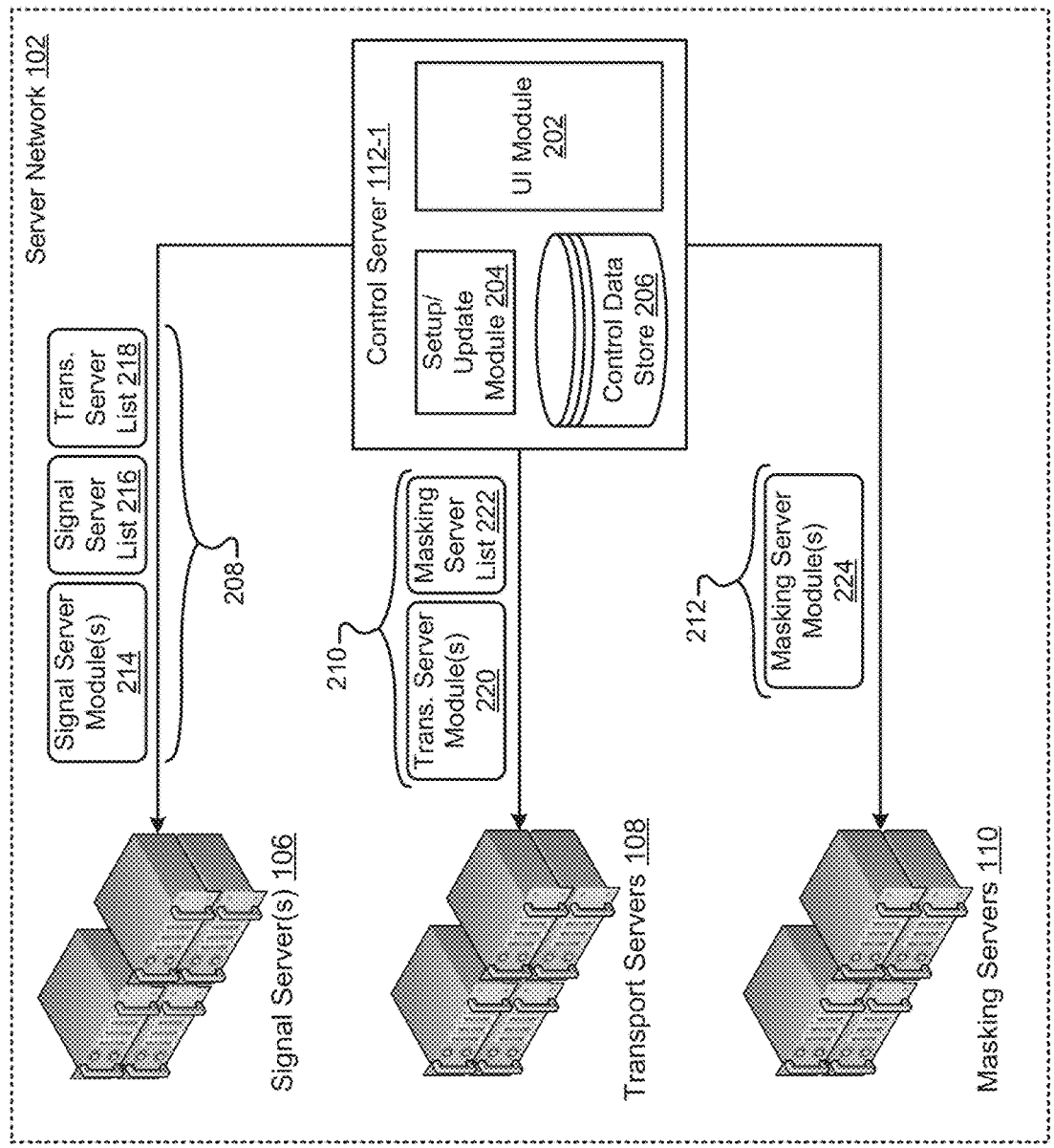
FIG. 2 illustrates the setup of signal servers, transport servers, and masking servers.
Figure 2:
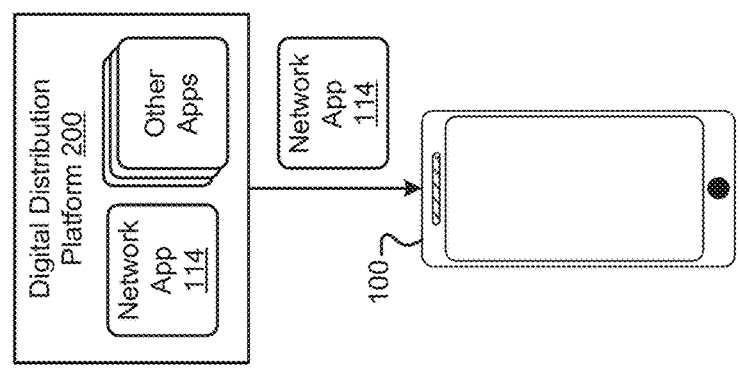
Figure 3:
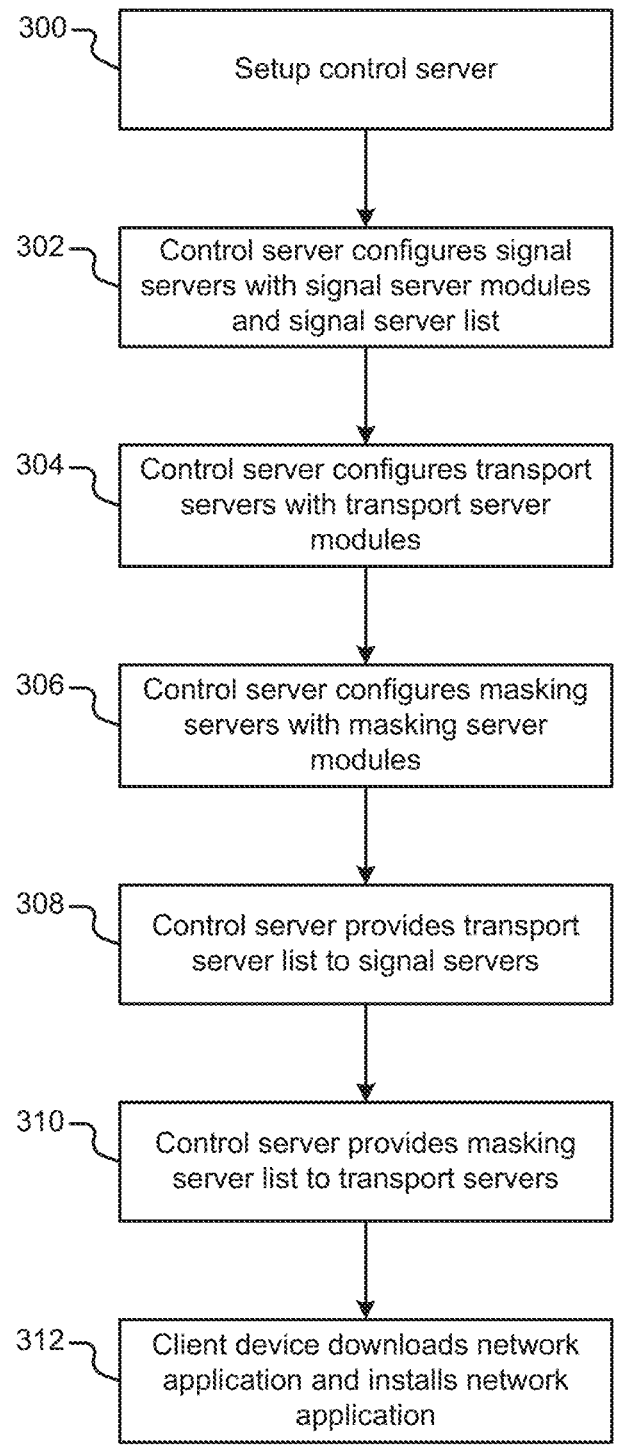
FIG. 3 is a flow diagram of an example method describing setup of the signal servers, transport servers, and masking servers.

FIGS. 2-3 illustrate setup of the signal servers 106, transport servers 108, and masking servers 110. The network administrator can use the control server 112-1 to setup and further configure/update the signal servers 106, transport servers 108, and masking servers 110. Additionally, FIGS. 2-3 describe acquisition of the network application 114 by a client device 100. Although a single control server 112-1 is illustrated, the server network 102 may include additional control servers 112.

FIG. 2 is an example functional block diagram that illustrates the client device 100 acquiring (e.g., downloading) the network application 114 from a digital distribution platform 200. The digital distribution platform 200 may represent computing systems that are configured to distribute native applications to client devices 100. Example digital distribution platforms 200 include, but are not limited to, the GOOGLE PLAY® digital distribution platform by Google, Inc. and the APP STORE® digital distribution platform by Apple, Inc. In some implementations, the network application 114 may be acquired from locations other than the digital distribution platform 200. For example, the network application 114 may be preinstalled on the client device 100 when the user purchases the client device 100. The network application 114 can be modified over time (e.g., by updates). For example, the client device 100 may acquire newer versions of the network application 114 from the digital distribution platform 200. The newer versions of the network application 114 may include additional/alternative lists of signal servers 106 and transport servers 108. As another example, the network application 114 may acquire updated lists of signal servers 106 and transport servers 108 from one or more signal servers 106.

The network administrator may distribute the network application 114 (e.g., using a digital distribution platform 200). The network administrator may also provide software modules (e.g., the network module 400 of FIG. 4B) to an application developer for inclusion into the developer's application. In this case, the developer's application can use the network module functionality to access the server network 102. The provided software modules may include software libraries and functions/methods that may be included in applications. The functions/methods may be invoked to provide the various functionalities described herein. For example, the functions/methods may be invoked to manage connections and data transfer.

The network operator may acquire and setup the servers 106, 108, 110, 112. In some implementations, the servers may be geographically distributed (e.g., in different data centers). The servers may be implemented as virtual machines and/or dedicated servers. For example, the servers may be implemented (e.g., in part) in a variety of data centers provided by online computing platforms, such as Amazon Web Services (AWS), Inc.

Initially, the network administrator may set up the control server 112. For example, the network administrator may install a control server software package on a computing device (e.g., desktop, laptop, or mobile device). The software package may include the software and data on the control server 112-1 described herein, such as a user interface (UI) module 202, a setup/update module 204, and a control data store 206. The control server may be implemented on an administrator's computing device (e.g., personal computing device) locally or via an interface to a remotely located control server. The interface may include a command line interface and/or be GUI based.

The network administrator can use the control server 112-1 to setup the signal servers 106, transport servers 108, and masking servers 110. The control server UI module 202 can generate a user interface, such as a GUI and/or a command line interface. The network administrator can use the generated interface to set up and manage (e.g., monitor and update) the signal servers 106, transport servers 108, and masking servers 110. The setup/update module 204 can setup and update the servers according to the network administrator's commands entered into control server UI.

The signal servers 106, transport servers 108, and masking servers 110 can be set up with different IP addresses that uniquely identify each of the servers. In some implementations, the servers may be identified by a unique server identifier, such as a randomly generated internal identifier. The servers 106, 108, 110, 112 may be implemented on one or more physical servers. In some implementations, one or more of the servers may be virtual servers.

The control server 112-1 can include a control data store 206 that stores software packages for setting up the signal servers 106, transport servers 108, and the masking servers 110. For example, the control server 112-1 may include a signal server package 208, a transport server package 210, and a masking server package 212 for setting up the signal servers 106, transport servers 108, and masking servers 110, respectively. The software packages may include one or more executable files, software libraries, and documentation. The network administrator can deploy (e.g., install) the software packages 208, 210, 212 to the servers 106, 108, 110 in order to set up the servers 106, 108, 110 for communication with the client devices 100, each other, and target servers 104, as described herein.

FIG. 2 illustrates the control server 112-1 deploying the software packages 208, 210, 212 to the servers 106, 108, 110. The signal server package 208 may include signal server modules 214, a signal server list 216, and a transport server list 218. The transport server package 210 may include transport server modules 220 and a masking server list 222. The masking server package 212 may include masking server modules 224. The modules and lists illustrated in FIG. 2 are only example contents of the software packages. As such, the software packages may include additional or alternative data than that illustrated in FIG. 2. Example modules implemented on the servers are illustrated and described in more detail with respect to FIG. 5.

Some servers can be set up with server lists (e.g., lists of IP addresses) that identify other servers in the network. For example, the signal servers 106 may be set up to include a list of other signal server IP addresses and a list of available transport server IP addresses. As another example, the transport servers 108 may be set up to include a list of masking server IP addresses. The network administrator can use the control server 112-1 to update the lists. For example, the network administrator can insert updated lists into the control server UI module 202 and the setup/update module 204 can apply the update to the servers. The network administrator may create the updated server lists based on servers that have been added or removed from the network. The lists can also be updated automatically (e.g., see FIGS. 13-14).

In some implementations, the software packages (e.g., modules) can include configuration parameters (e.g., configuration files). The configuration parameters can vary by server type. Example configuration parameters may include, but are not limited to, parameters for triggering a signal server update, parameters that control how signal servers update one another, and parameters indicating how client devices should be updated.

In general, the control server 112-1 may be used by a network administrator to setup servers, monitor servers, and update servers. In some implementations, the control server 112-1 may be offline until the network administrator brings the control server 112-1 online in order to setup the servers, monitor the servers, and/or update the servers.

FIG. 3 illustrates a method describing setup of the servers 106, 108, 110, 112-1 and acquisition of the network application 114. In block 300, the network administrator sets up the control server 112-1. In block 302, the network administrator uses the control server 112-1 to configure the signal servers 106 with signal server modules 214 and a signal server list 216. In block 304, the network administrator uses the control server 112-1 to configure the transport servers 108 with transport server modules 220. In block 306, the network administrator uses the control server 112-1 to configure the masking servers 110 with masking server modules 224. In block 308, the network administrator provides the transport server list 218 to the signal servers 106. In block 310, the network administrator uses the control server 112-1 to provide the masking server list 222 to the transport servers 108. In block 312, a user can download the network application 114 to the client device 100 and install the network application 114 on the client device 100.

Figure 4A:
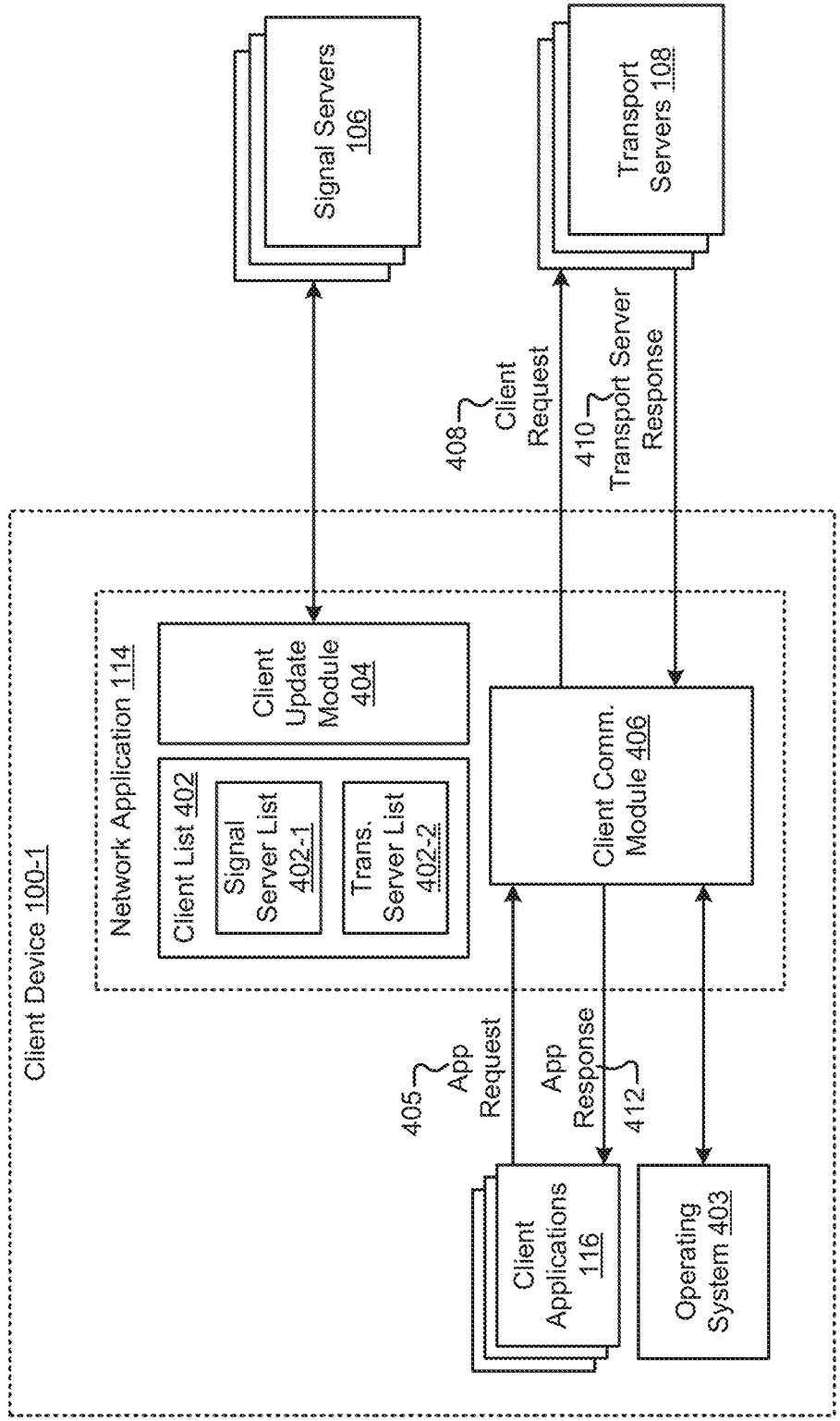
FIGS. 4A-4B are functional block diagrams that illustrate implementations of a network application and a network module on a client device.
Figure 4B:
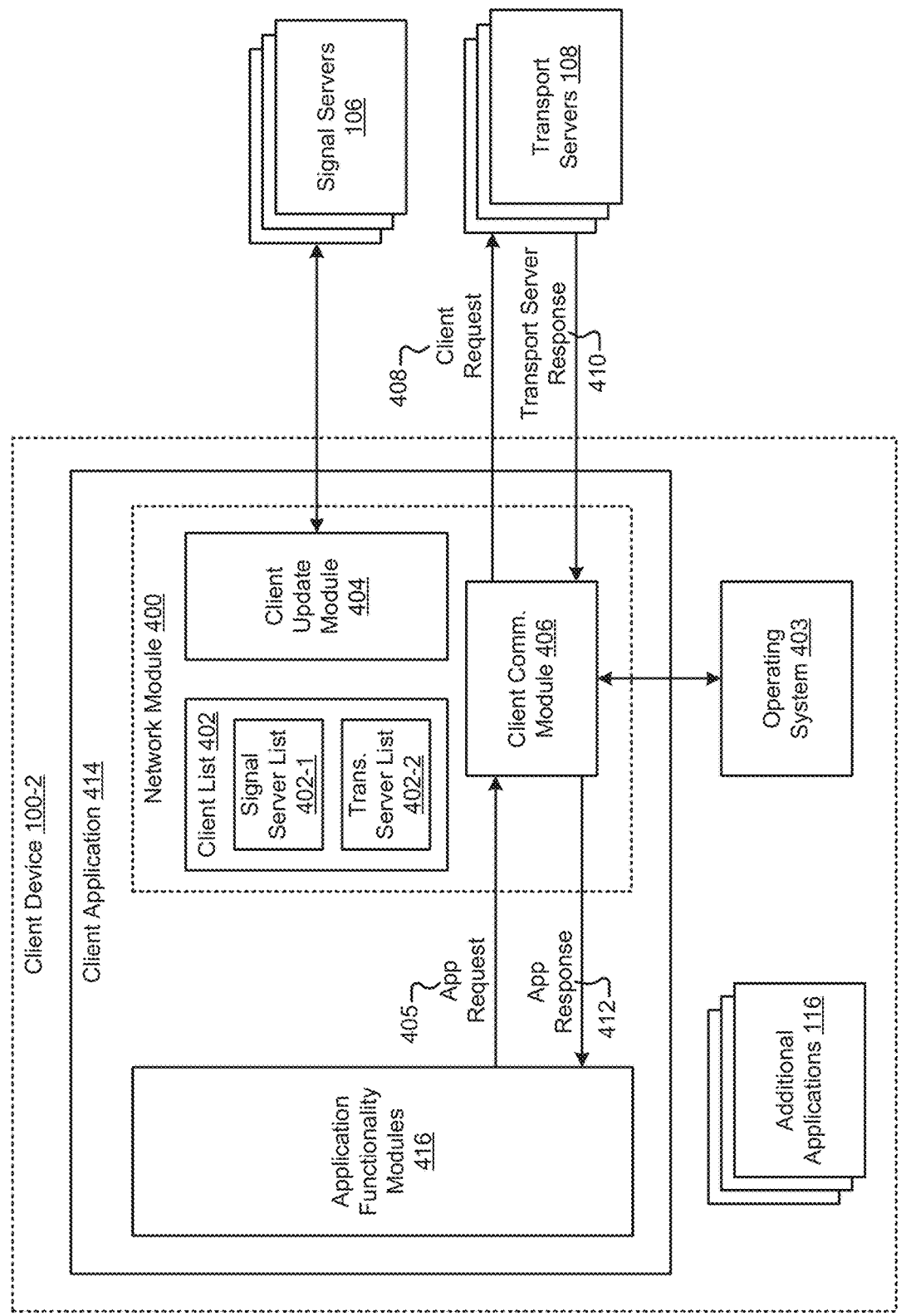

FIGS. 4A-4B illustrate implementations of the network application 114 and the network module 400 on a client device 100-1, 100-2. The client devices 100-1, 100-2 of FIGS. 4A-4B include an operating system 403 and installed applications 116. Example operating systems 403 may include ANDROID® developed by Google Inc. or IOS® developed by Apple Inc. In an example where a client device 100 is a laptop or desktop computing device, the client device 100 may run an operating system 403 including, but not limited to, MICROSOFT WINDOWS® by Microsoft Corporation, MAC OS® by Apple, Inc., or Linux. Example installed applications may include, but are not limited to, e-commerce applications, video streaming applications, messaging applications, social media applications, business review applications, banking applications, gaming applications, and weather forecast applications.

FIG. 4A illustrates an example client device 100-1 that includes a network application 114. The network application 114 provides for communication with the signal servers 106 and transport servers 108. For example, the network application 114 can receive a data request from a client application 116, communicate with a transport server 108, and return a response to the client application 116. The requests described herein may represent requests by an application for data from the target server 104. The responses described herein may represent data sent by the target server 104 back to the client device 100-1 in response to a request.

The types of requests/responses and the way in which the client applications 116 may use the received response data may vary, depending on the functionality associated with a client application 116. For example, if the client application is a web browser application, the client application may send an HTTP GET request, receive an HTTP response (e.g. text and/or images), and then render a portion (or all) of a webpage. As another example, if the client application is a file storage application, the client application may send a request for a file, receive a portion (or all) of the file in the response, and store the file locally on the client device. As another example, if the client application is a video streaming application, the client application may send one or more requests to the target server for movie descriptions and previews. The target server may send back one or more responses for different movie descriptions and images. Furthermore, the client application can send one or more requests for a selected movie and the target server may respond by streaming the movie in one or more responses.

The network application includes a client list 402, a client update module 404, and a client communication module 406. The client list 402 can include a signal server list 402-1 and a transport server list 402-2. The signal server list 402-1 includes a list of signal server IP addresses. The transport server list 402-2 includes a list of transport server IP addresses. Initially, the signal server IP addresses and the transport server IP addresses may be included with the network application 114 (e.g., included with the downloaded/installed application). In some implementations, the initial client list 402 can include one or more signal server IP address and an empty transport server list. In other implementations, the initial client list 402 can include one or more signal server IP addresses and a plurality of transport server IP addresses.

The client update module 404 can retrieve updated signal server IP addresses and transport server IP addresses over time. For example, after installation, the client update module 404 may retrieve updated lists of signal server IP addresses and transport server IP addresses from the one or more signal server IP addresses included in the initial client list 402. The client update module 404 may also notify one or more signal servers 106 when an error occurs in the server network 102. For example, the client update module 404 may generate a client report 501 (see FIG. 5) that notifies one or more signal servers 106 that a transport server 108 and/or masking servers 110 are unavailable. The signal server communication module 518 may update the transport server list 522 and/or the signal server list 524 based on the received client report 501. The signal server update module 520 may also update other signal servers based on the client report 501. Additionally, the signal server update module 520 may receive updates from other signal servers and update the transport server list 522 and/or the signal server list 524 (e.g., see FIGS. 13-14).

The client communication module 406 can provide for communication between the transport servers 108 and client applications 116. For example, the client communication module 406 can receive an application request 408 from a client application 116 and then select a transport server 108 to use in order to communicate with the target server 104. The client communication module 406 can send a client request 408 to the selected transport server 108. If communication to the target server 104 via the server network 102 is successful, the client communication module 406 may receive a transport server response 410 and then send an application response 412 back to the client application 116. In cases where communication with the target server 104 is not successful, the client communication module 406 may report the condition to the client update module 404, which may then update one or more signal servers 106.

The application requests may include a request payload along with a target server URL or IP address. The client communication module 406 can encrypt the request payload (e.g., according to AES 256) and form one or more packets from the request payload. The packet size may be defined by the developer of the client application 116. The client communication module 406 can then select (e.g., randomly select) a transport server 108 from the transport server list 402-2 and open a connection to the selected transport server 108, such as a Transmission Control Protocol (TCP) connection. The client communication module 406 may exchange keys with the selected transport server 106 in some implementations. The client communication module 406 can send the formed packets to the transport server 106. The connection between the client device 100-1 and the transport server 106 may be kept alive (e.g., a keep-alive connection) until the client communication module 406 receives a reply from the transport server 106.

The client communication module 406 can communicate with the operating system 403 to send the client request 408 to a transport server 106 and receive the transport server response 410. For example, the operating system 403 may allow the client communication module 406 to send packet data to device hardware and work as a connection handler (e.g., for a specific application and/or multiple applications). Interaction between the client communication module 406 and operating system 403 may vary, depending on the operating system 403.

FIG. 4B illustrates a client device 100-2 that includes a plurality of installed applications 116. The installed client application 414 in FIG. 4B includes a network module 400. The network module 400 is included as a component of the client application 414 in FIG. 4B, instead of as a stand-alone application 114 in FIG. 4A. For example, the developer of the client application 414 in FIG. 4B may have included the network module 400 in the client application 414 so that the client application 414 can communicate with the server network 102. The network module 400 can include the functionality attributed to the network application 114 of FIG. 4A. For example, the network module 400 may include a client list 402, a client update module 404, and a client communication module 406 that provide similar functionality as described with respect to the network application 114 of FIG. 4A.

The client application 414 includes application functionality modules 416. The application functionality modules 416 may represent application-specific functionality included in the client application 414. The application functionality modules 416 may vary, depending on the type of client application 414. For example, if the client application 414 is a web browser application, the application functionality modules 416 may render webpages. As another example, if the client application 414 is a video streaming application, the application functionality modules 416 may render movie descriptions/images and play movies for the user.

The application functionality modules 416 can generate the application request 405 for the network module 400, receive the application response 412 from the client communication module 406, and operate according to the received application response 412. The types of application requests and application responses, along with the actions taken by the application functionality modules 416, may vary depending on the specific client application. One or more of the installed applications 116 may include a network module 400. In some implementations, other installed applications may make application requests and receive application responses using the network module 400 of the client application 414.

Figure 5:
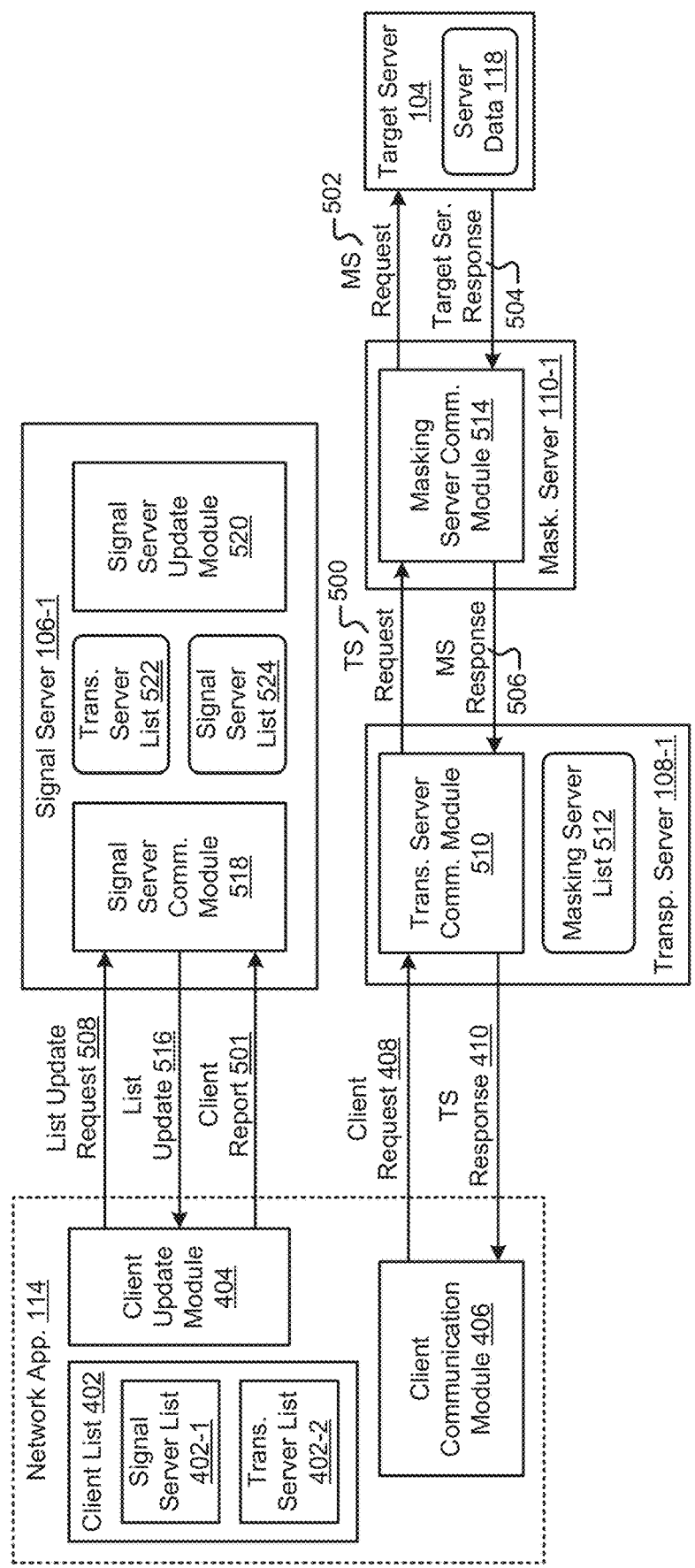
FIG. 5 illustrates an example signal server, an example transport server, and an example masking server.
Figure 6:
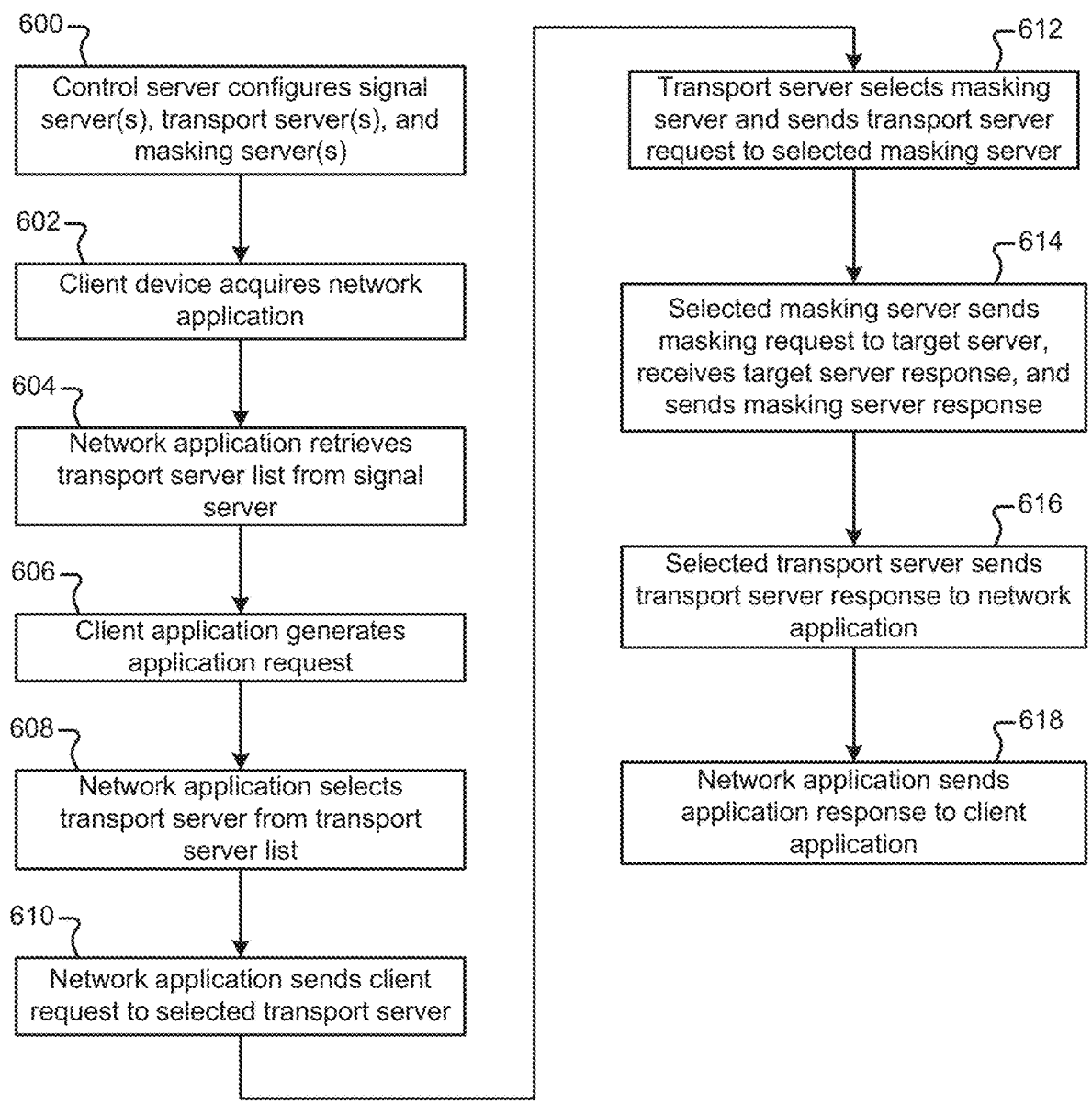
FIG. 6 is a flow diagram of an example method describing operation of the client device and servers in communication with the target server.

FIG. 5 illustrates an example signal server 106-1, an example transport server 108-1, and an example masking server 110-1. The example servers 106-1, 108-1, 110-1 include modules that implement the functionality attributed to the servers 106-1, 108-1, 110-1. FIG. 5 illustrates an example network application 114 on a client device 100-1 (not illustrated) in communication with the servers 106-1, 108-1, 110-1. FIG. 6 is an example method describing operation of the client device and servers 106-1, 108-1, 110-1 in communication with the target server 104.

FIG. 5 illustrates a single example request/response cycle in which the transport server 108-1 and masking server 110-1 may act as relays. Each request/response cycle includes the transmission of a request from the client device 100-1 to the target server 104 through the transport server 108-1 and masking server 110-1. Each request/response cycle may also include the transmission of a response back to the client device 100-1 through the masking server 110-1 and transport server 108-1. A single request/response cycle may use the same path through the server network 102 for the requests and responses. For example, a single request/response cycle may use the same transport server and masking server between the client device and target server. In some cases, a single request/response cycle can include a single packet request and/or single packet response. In other cases, a single request/response cycle can include the transmission of multiple packets in the request and/or response. A request/response cycle may end when the client communication module 406 selects a new transport server (e.g., in response to a new application request). As described herein, each request/response cycle can use different arrangements of servers, assuming the client device selects different transport servers and/or the transport server selects different masking servers (e.g., see FIG. 12).

The requests and responses generated by the client device 100-1 and servers 108-1, 110-1 may be referred to herein according to the device that generates the request/response. For example, the client generates a client request 408. The transport server 108-1 and masking server 110-1 generate a transport server request 500 and a masking server request 502, respectively. The target server 104 generates a target server response 504 in response to receiving the masking server request 502. The masking server 110-1 and the transport server 108-1 generate a masking server response 506 and a transport server response 410, respectively. Accordingly, a single request/response cycle may include an application request 405, a client request 408, a transport server request 500, a masking server request 502, a target server response 504, a masking server response 506, a transport server response 410, and an application response 412.

The client request 408, transport server request 500, and masking server request 502 may include similar content (e.g., a request payload). The target server response 504, masking server response 506, and transport server response 410 may include similar content (e.g., a response payload). Note that the requests/responses may be encrypted between each of the devices.

Figure 7A:
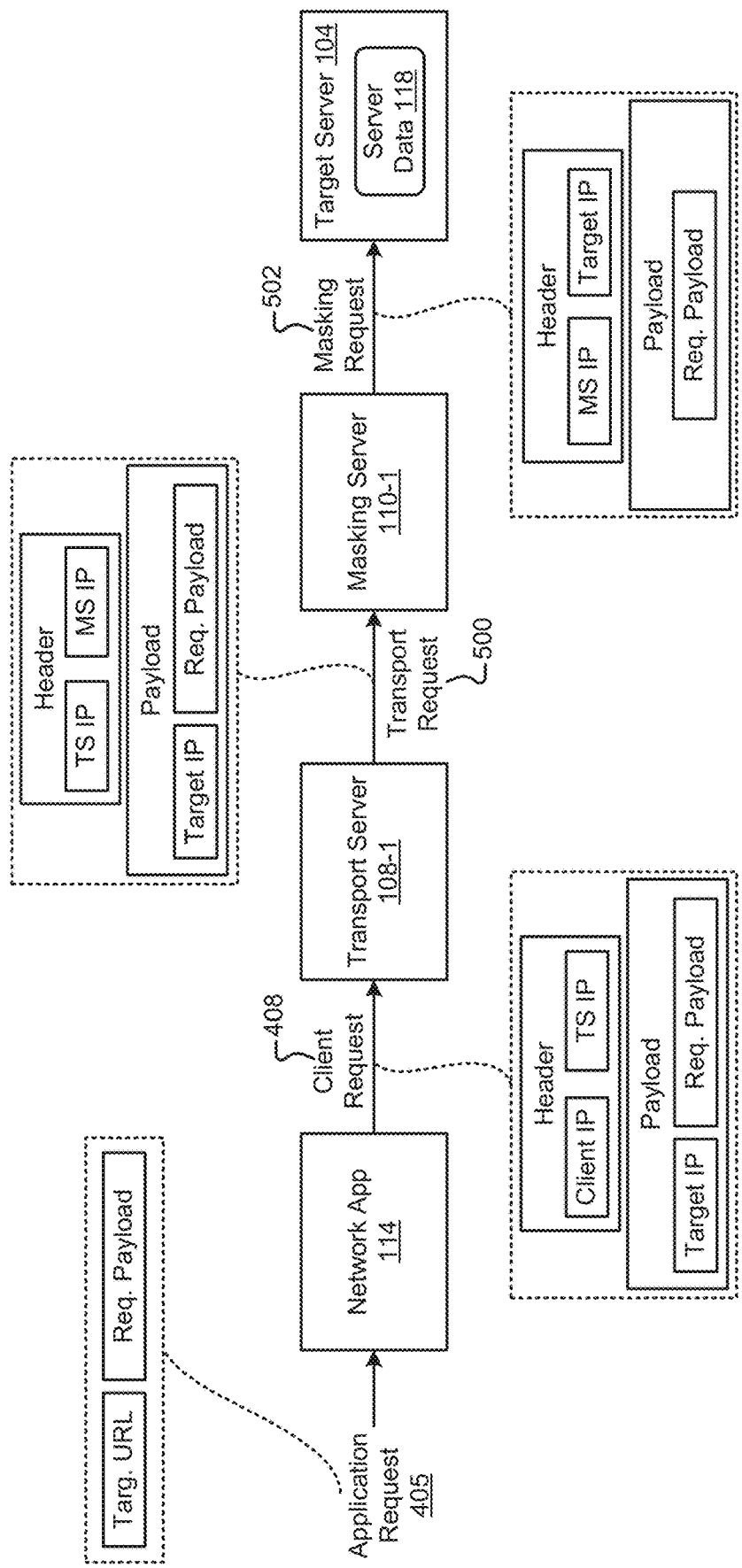
FIGS. 7A-7B illustrate example packet data transferred between the client device, a transport server, a masking server, and a target server.
Figure 7B:
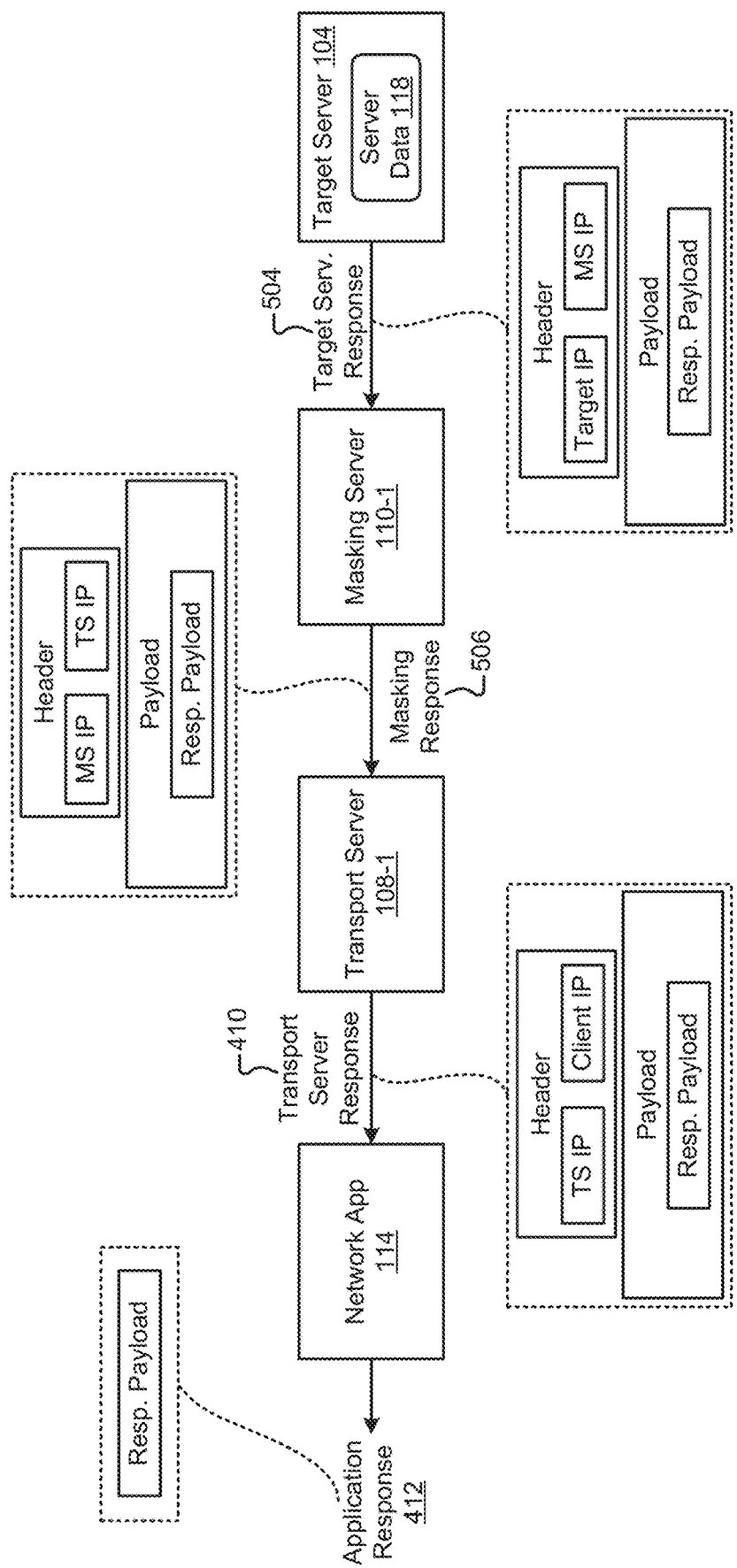

FIGS. 7A-7B illustrate an example request/response cycle. FIG. 7A illustrates a series of requests along with some example network packet data. The network packet data of FIG. 7A is only example data, and does not include all data that may be included in a network packet (e.g., an IP packet). The application request 405 includes a target server URL (or other target server address) along with a request payload. The client request 408 includes a header with a client IP source and transport server IP destination. The client request 408 also includes a payload that may include the target server IP address and the request payload. The transport server request 500 includes a header with a transport server IP source and a masking server IP destination. The transport server request 500 also includes a payload that may include the target server IP address and the request payload. The masking server request 502 includes a header that includes a masking server IP source and a target server IP destination.

FIG. 7B illustrates a series of responses along with some example network packet data. The target server response 504 includes a header with a target server IP source and a masking server IP destination. The target server response 504 also includes a response payload. The masking server response 506 includes a header with a masking server IP source and a transport server destination. The masking server response 506 also includes a response payload. The transport server response 410 includes a header with a transport IP source and a client device IP destination. The transport server response 410 also includes a response payload. The network application 114 sends the response payload to the client application 116 in the application response 412.

In some cases, the server data 118 may be returned to the client device 100 in a single request/response cycle, such as in one or more response payloads. In other cases, the server data 118 may be returned to the client device 100 using multiple request/response cycles, each of which may include one or more response payloads.

Referring back to FIG. 5, the client update module 404 can update the client's signal server list 402-1 and the client's transport server list 402-1. The client update module 404 can retrieve current transport server IP addresses and current signal server IP addresses from one or more of the signal servers 106. For example, the client update module 404 may be configured to request an updated list of signal server IP addresses and transport server IP addresses from one or more signal servers 106. The request for the updated servers is illustrated herein as a list update request 508 in FIG. 5. The list update request 508 may be received by the signal server communication module 518, which may then provide a list update 516 to the client update module 404.

In some implementations, the client update module 404 is configured to send a list update request 508 after the network application 114 (or network module 400) is installed, such as the first time the network application 114 is executed after installation. The client update module 404 may also be configured to send a list update request 508 to the signal server 106-1 under other conditions, such as each time the network application 114 is started and/or at predetermined intervals (e.g., each hour, day, or week). In some implementations, the client update module 404 may be configured to send a list update request 508 in response to an update on the client device, such as an update to the operating system version, network application 114, or other application that uses the network application 114.

The network application 114 can communicate with the transport servers 108 using the client communication module 406. For example, the network application 114 can receive an application request 405 from another application and then select a transport server 108 to use in order to communicate with the target server 104. The client communication module 406 selects the transport server from the client list 402. For example, the client communication module 406 can randomly select a transport server IP address from the client list 402.

The transport server 108-1 includes a transport server communication module (hereinafter "transport communication module 510") that provides communication functionality for the transport server 108-1. The client communication module 406 sends the client request 408 to the selected transport server 108-1. The transport server 108-1 includes a masking server list 512 that includes masking server IP addresses. In response to communication with the client device 100-1, the transport communication module 510 selects a masking server IP address from the masking server list 512. For example, the transport communication module 510 may randomly select one of the masking server IP addresses from the masking server list 512. The masking server lists 512 may include complete or partial lists of the masking servers in the server network 102. For example, each masking server list may be a complete list of masking servers in some implementations. As another example, different transport servers may include masking server lists for different subsets of masking servers.

The transport server 108-1 sets up a connection with the selected masking server 110-1. The masking server includes a masking server communication module 514 (hereinafter "masking communication module 514") that provides communication functionality for the masking server 110-1, such as setting up the connection with the transport communication module 510. The transport communication module 510 sends the transport server request 500 to the masking communication module 514.

The masking server 110-1 (e.g., the masking communication module 514) may then set up a connection with the target server 104. The masking server 110-1 sends the masking server request 502 to the target server 104 and receives a target server response 504 from the target server 104. The contents of the target server response 504 may depend on the type of request the target server 104 receives. The masking server 110-1 (e.g., the masking communication module 514) sends a masking server response 506 to the transport server 108-1 (e.g., transport communication module 510), and then the transport server 108-1 sends the transport server response 410 to the client device 100-1 (e.g., the client communication module 406). The client communication module 406 may then send the application response 412 to the client application 116 (or application functionality modules 416) that made the application request 405.

FIG. 6 illustrates an example method describing operation of the client device 100-1 and servers 108-1, 110-1 of FIG. 5 for successful communication between the client device 100, servers 108-1, 110-1, and target server 104 for a single request/response cycle. Blocks in the method may be repeated for additional requests/response cycles.

In block 600, the control server 112 configures the signal servers 106, transport servers 108, and masking servers 110

(e.g., see FIGS. 2-3). In block 602, the client device 100 acquires the network application 114. In block 604, the network application 114 retrieves an updated transport server list from the signal server 106-1.

In block 606, the client application 116 generates an application request 405. In block 608, the network application 114 (e.g., client communication module 406) selects (e.g., randomly selects) a transport server IP address from the updated transport server list 402-2. In block 610, the network application 114 (e.g., client communication module 406) sends a client request 408 to the selected transport server 108-1.

In block 612, the transport server communication module 510 selects (e.g., randomly selects) a masking server from the masking server list 512 and sends a transport server request 500 to the selected masking server 110-1. In block 614, the masking communication module 514 sends a masking server request 502 to the target server 104, receives a target server response 504, and sends a masking server response 506 to the target server 108-1. In block 616, the transport communication module 510 sends a transport server response 410 to the network application 114. The network application 114 sends the application response 412 to the client application 116 in block 618.

Figure 8:
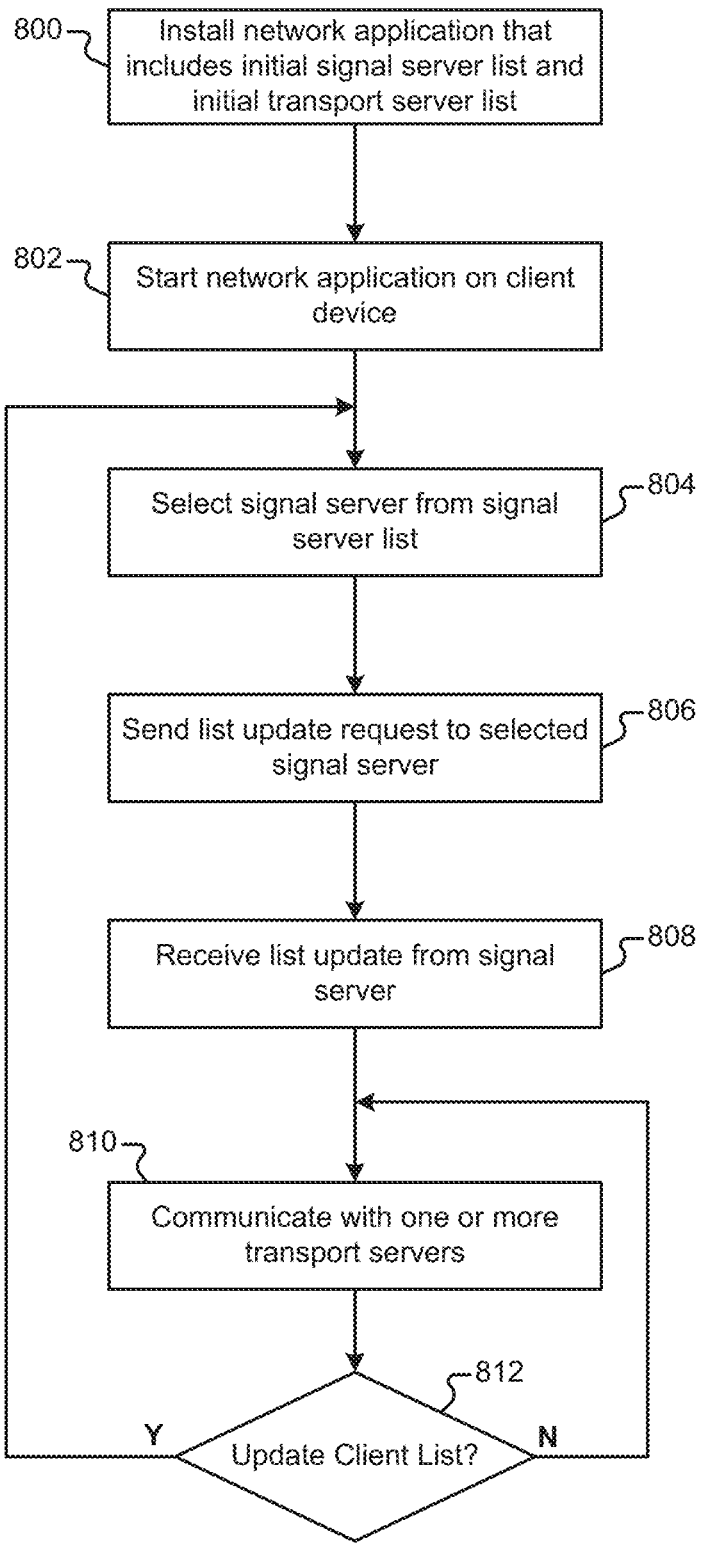
FIG. 8 is a flow diagram of an example method describing updating of the network application after installation.

FIG. 8 illustrates an example method describing updating of the network application 114 after installation. Initially, in block 800, the user installs the network application 114 on the client device 100. The acquired network application 114 may include an initial client list 402 that includes an initial signal server list 402-1 and an initial transport server list 402-2. In block 802, the user starts the network application 114. In block 804, the client update module 404 selects a signal server IP address from the initial list 402-1 of one or more signal server IP addresses. If multiple signal server IP addresses are available in the initial list, the client update module 404 may select the first signal server IP address or select the signal server IP address randomly, for example.

In block 806, the client update module 404 sends a list update request 508 to the selected signal server 106-1. In block 808, the client update module 404 receives the list update 516 from the signal server. The list update can include a list of transport server IP addresses and a list of signal server IP addresses.

In block 810, the client communication module 406 may communicate with one or more transport servers 108 included in the updated list received in block 808. In block 812, the client update module 404 determines whether to update the client list 402 again. The client update module 404 may update the client list 402 in response to satisfaction of one or more client update criteria. If the client update criteria are satisfied, the client update module 404 may select a signal server 106 from the signal server IP list acquired in block 808 and retrieve another updated list from the signal server according to blocks 806-808.

Example client update criteria may be based on whether transport servers are available in the current client list 402. For example, the client update module 404 may send a list update request 508 when no transport servers are available on the client list 402. Additional example client update criteria may be based on the number of transport servers that are unavailable on the current client list 402. For example, the client update module 404 may send a list update request 508 in response to a single transport server being unavailable. As another example, the client update module 404 may send a list update request 508 in response to a threshold number of unavailable transport servers. Additional client update criteria may include the number of response/request cycles since a last update. For example, the client update module 404 may send a list update request 508 after a threshold number of request/response cycles. Additional client update criteria may include an amount of time since a previous client list update. For example, the client update module 404 may send a list update request 508 after a threshold amount of time since the last client list update 516.

The client update module 404 may be configured to send the list update request 508 to the last used signal server (e.g., the last successfully available signal server). If the last used signal server is unavailable, the client update module 404 may send the list update request 508 to another signal server on the signal server list 402-1, such as the next signal server on the signal server list 402-1, or a randomly selected signal server. In some implementations, the client update criteria may include detection of an unavailable signal server. For example, the client update module 404 may send a list update 508 to one of the signal servers in response to determining that one or more of the other signal servers are unavailable.

In the case that none of the signal servers 106 can be reached for an update, the network application 114 may notify the user that none of the signal servers 106 can be reached. In some implementations, the network application 114 may indicate to the user via a notification (e.g., a GUI notification) that the user should download an update to the network application 114. The developer of the network application 114 (e.g., network administrator) may provide a more up-to-date signal server list in the newer versions of the network application 114. In some implementations, the client update module 404 may notify the network administrator (e.g., via the control server 112) that all signal servers are unavailable, which may cause the network administrator to setup additional signal servers.

Figure 9:
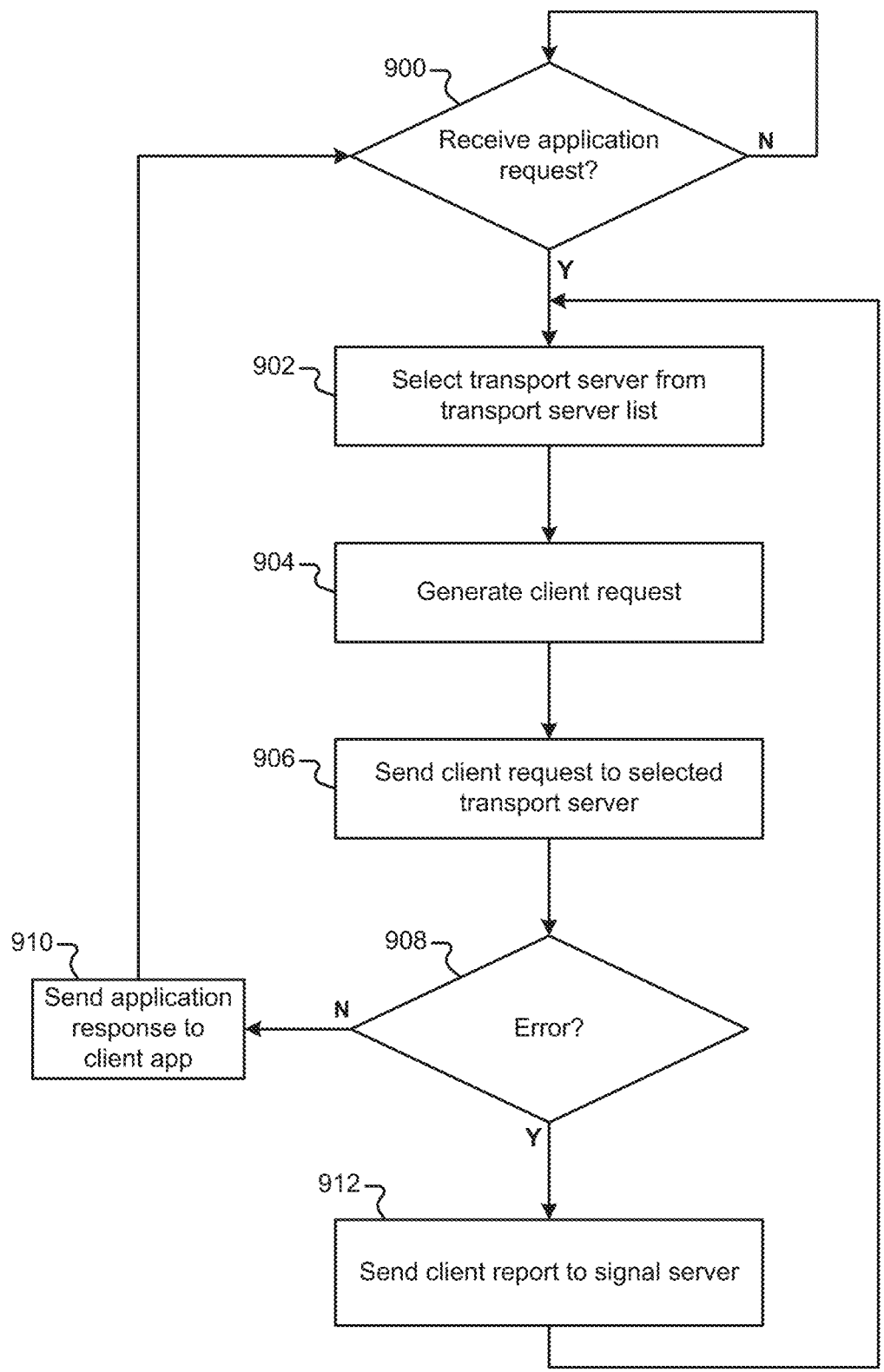
FIG. 9 is a flow diagram of an example method describing operation of the network application in communication with the transport servers and signal servers.

FIG. 9 illustrates an example method describing operation of the network application 114 in communication with the transport servers 108 and signal servers 106. For example, the method describes communication with one or more transport servers 108 and the reporting of server network errors/issues to one or more signal servers 106.

Initially, in block 900, the client communication module 406 waits to receive an application request 405. In response to receiving an application request 405, the client communication module 406 selects a transport server 108 from the transport server list 402-2 in block 902. In block 904, the client communication module 406 generates the client request 408 based on the received application request 405 and the selected transport server IP address. In block 906, the client communication module 406 transmits the client request 408 to the selected transport sever 108.

In block 908, the client communication module 406 may wait for the transport server response 410. If the client communication module 406 receives a transport server response (e.g., no error in the server network 102), the client communication module 406 sends the application response 412 to the client application 116 in block 910. If the client communication module 406 determines there is an error in block 908, the client communication module 406 may send a client report 501 that details the error(s) to a signal server 106 in block 912.

The information included in the client report 501 may depend on the types of detected errors and how those errors are manifested in the server network 102. Example errors in the server network 102 may be caused by blocked servers, downed servers (e.g., hardware/software errors), client transitions between networks (e.g., between a cellular and WiFi network), and a cellphone malfunction (e.g., low/empty battery).

In general, an error in the server network 102 may result in the unavailability of one or more of the servers 106, 108, 110. For example, an error in the server network 102 may cause one or more transport servers 108 and/or one or more signal servers 106 to be unavailable to the client device 100. As another example, an error in the server network 102 may cause one or more of the masking servers 110 to be unavailable to the transport servers 108. As another example, an error in the server network 102 may cause a target server 104 to be unavailable to one or more masking servers 110. The client report 501 may include an error code that identifies the type of error in the server network 102. In some implementations, an error code may be a number (e.g., an integer) that identifies the error.

In cases where a transport server is unavailable, the client communication module 406 may be unable to form a connection with the unavailable transport server or receive a transport server response. In some cases, the client communication module 406 may receive an error code (e.g., an HTTP response status code). In this example, the generated client report may include the client device IP address, the unavailable transport server IP address, error code, and a time stamp indicating when the error occurred.

In cases where the masking servers 110 are unavailable for a single transport server, the transport server may generate an error code for the client communication module 406 that indicates the condition. In these cases, the client report 501 may include, but is not limited to, the client device IP address, transport server IP address, an error code indicating the error, and a time stamp indicating when the error occurred.

In cases where a signal server is unavailable, the client update module 404 may be unable to form a connection with the unavailable signal server or receive a list update 516. In this example, the generated client report 501 may include the client device IP address, the unavailable signal server IP address, an error code, and a time stamp indicating when the error occurred.

The signal servers 106 may use the data included in the client reports to make decisions with respect to modifying the transport server lists 522 and the signal server lists 524. For example, the time stamps included in the client error reports may indicate whether the errors are recent or have been remedied in the past. As another example, the signal servers 106 may use the client IP address for geolocation and service provider determination (e.g., cell carrier, ISP).

Figure 13:
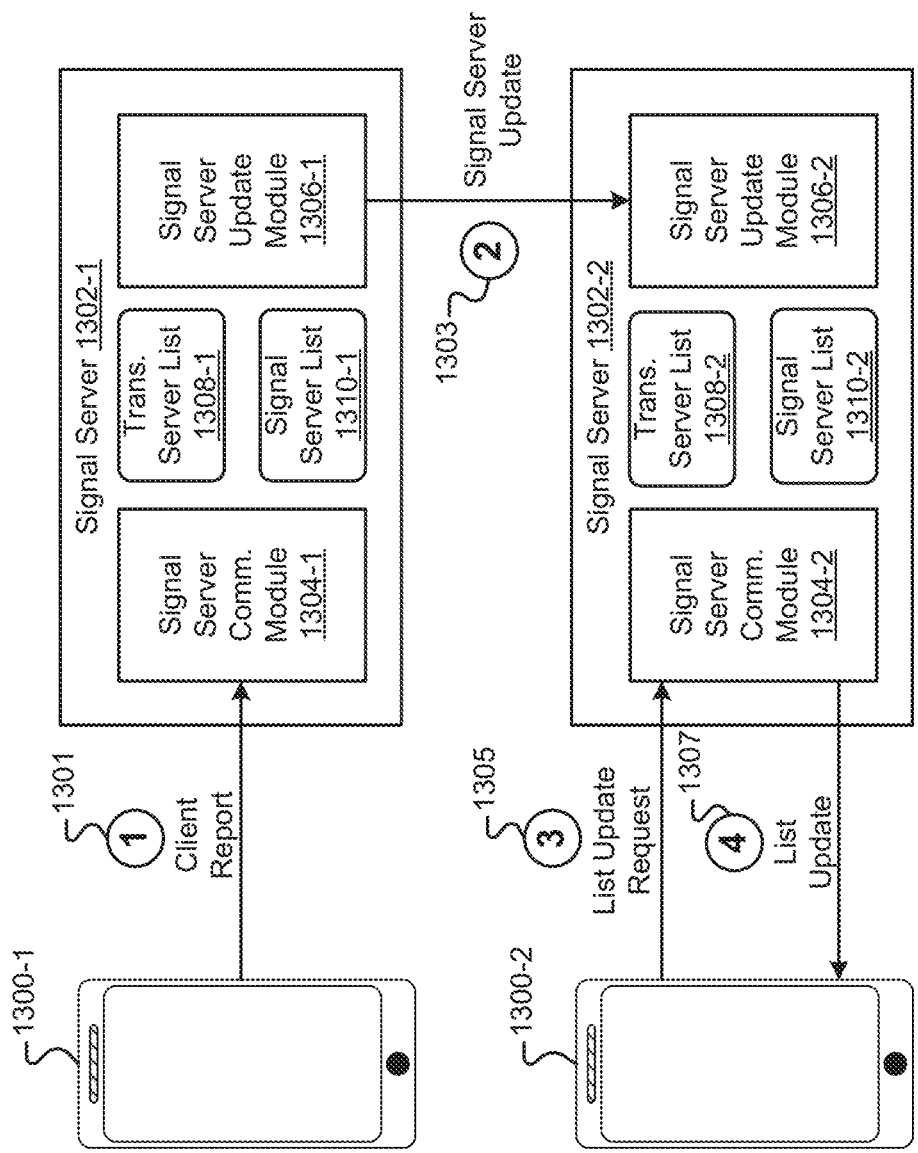
FIG. 13 is a functional block diagram illustrating how signal servers can receive client reports from client devices and update one another.
Figure 14:
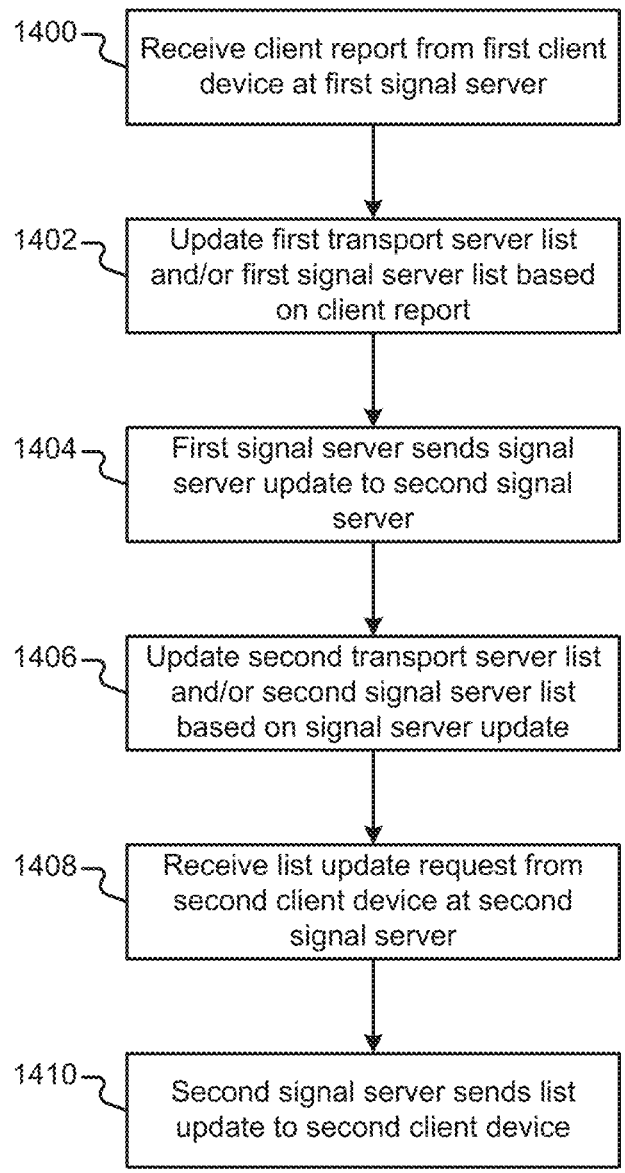
FIG. 14 is a flow diagram of an example method describing signal server updates.

As described with respect to FIGS. 13-14, the signal servers 106 can update their respective lists 522, 524 to include data from the client reports 501. The presence of reported errors for transport servers 108 may modify how signal servers 106 respond to client devices 100. For example, a signal server 106 may provide lists of transport servers and signal servers to a client device 100 based on the geolocation of the client device 100. In this specific example, the signal server 106 may provide lists of transport servers and signal servers that are likely available to the client device 100 (e.g., not the subject of a client report). In some implementations, a transport server 108 may be removed from the transport server lists 522 (e.g., if removal criteria are met).

Figure 10:
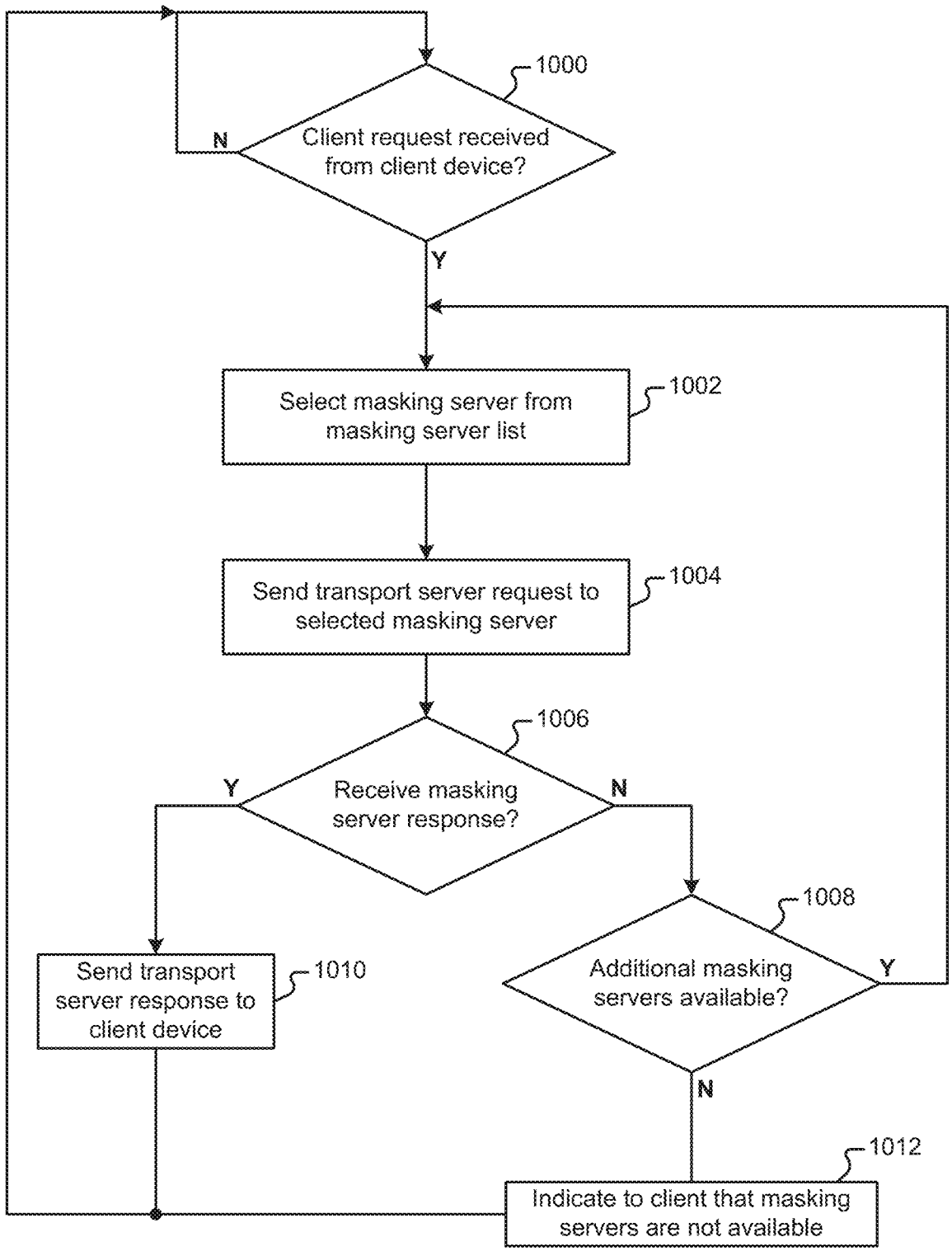
FIG. 10 is a flow diagram of an example method describing operation of a transport server.

FIG. 10 illustrates an example method describing operation of a transport server 108. In block 1000, the transport communication module 510 waits to establish a connection with a client device 100 and receive a client request 408. In response to establishing a connection and/or receiving the client request 408, the transport communication module 510 selects a masking server 110 from the masking server list 512 in block 1002. For example, the transport communication module 510 may randomly select one of the masking servers from the masking server list 512. In block 1004, the transport server 108 sets up a connection with the selected masking server 110 and transmits the transport server request 500 to the selected masking server 108.

In block 1006, the transport communication module 510 waits for a masking server response 506. If the transport communication module 510 receives a masking server response 506 (e.g., no error in the server network 102), the transport communication module 510 sends the transport server response 410 to the client device 100 in block 1010. If the transport communication module 510 does not make a connection to the masking server 110 or receive a masking server response 506, the transport communication module 510 can select another masking server from the masking server list 512 (e.g., randomly). If additional masking servers are available in block 1008, such as when all masking servers in the masking server list 512 have not been tried, the transport communication module 510 selects another masking server (e.g., randomly) in block 1002.

If additional masking servers are not available in block 1008, the transport communication module 510 can indicate to the client device 100 that masking servers 110 are not available for the transport server 108. For example, the transport communication module 510 can send an error code to the network application 114 that indicates the masking servers for the selected transport server are not available. The client update module 404 may then update the client list 402 and send a client report 501 to the signal server indicating either 1) that the transport server is generally unavailable and/or 2) the transport server is unavailable because the masking servers associated with the transport server are unavailable. In some cases, the client report 501 may include the error code received from the transport communication module 510.

Figure 11:
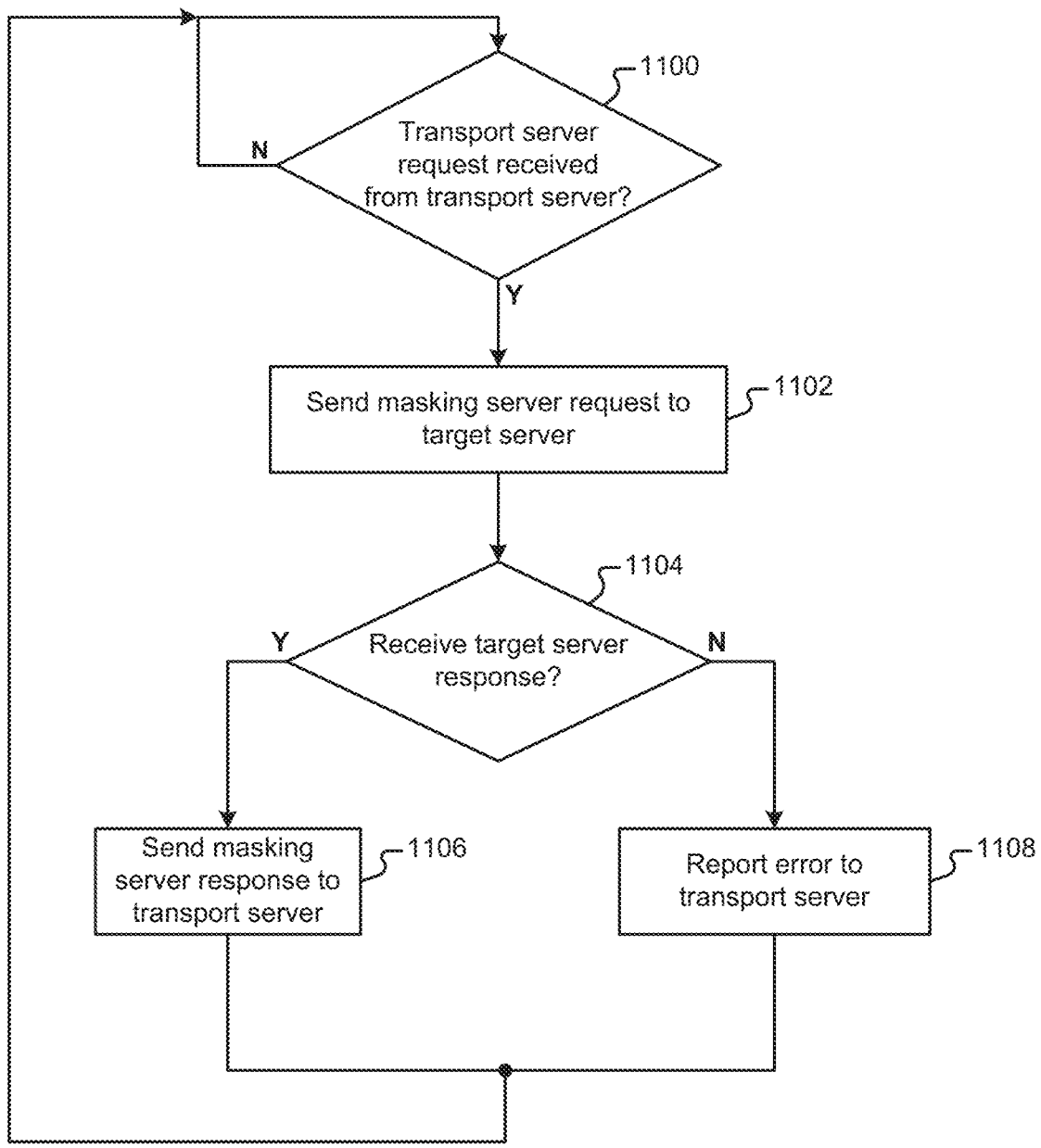
FIG. 11 is a flow diagram of an example method describing operation of a masking server.

FIG. 11 illustrates an example method describing operation of a masking server 110. In block 1100, the masking communication module 514 waits to establish a connection with the transport server 108 and receive a transport server request 500. In block 1102, the masking server 110 sends the masking server request 502 to the target server 104. If the masking server 110 receives the target server response 504 in block 1104, the masking server 110 sends the masking server response 506 to the transport server 108. If an error occurs during connection between the masking server 110 and/or the masking server 110 does not receive a response from the target server 104, the masking server 110 may report an error to the transport server 110 in the masking server response 506 in block 1108. Example errors may include errors indicating that the target server is down (e.g., HTTP response status codes or a site-specific error). This error can be sent from the transport server 108 to the client device 100 for handling by the client application 116.

Figure 12:
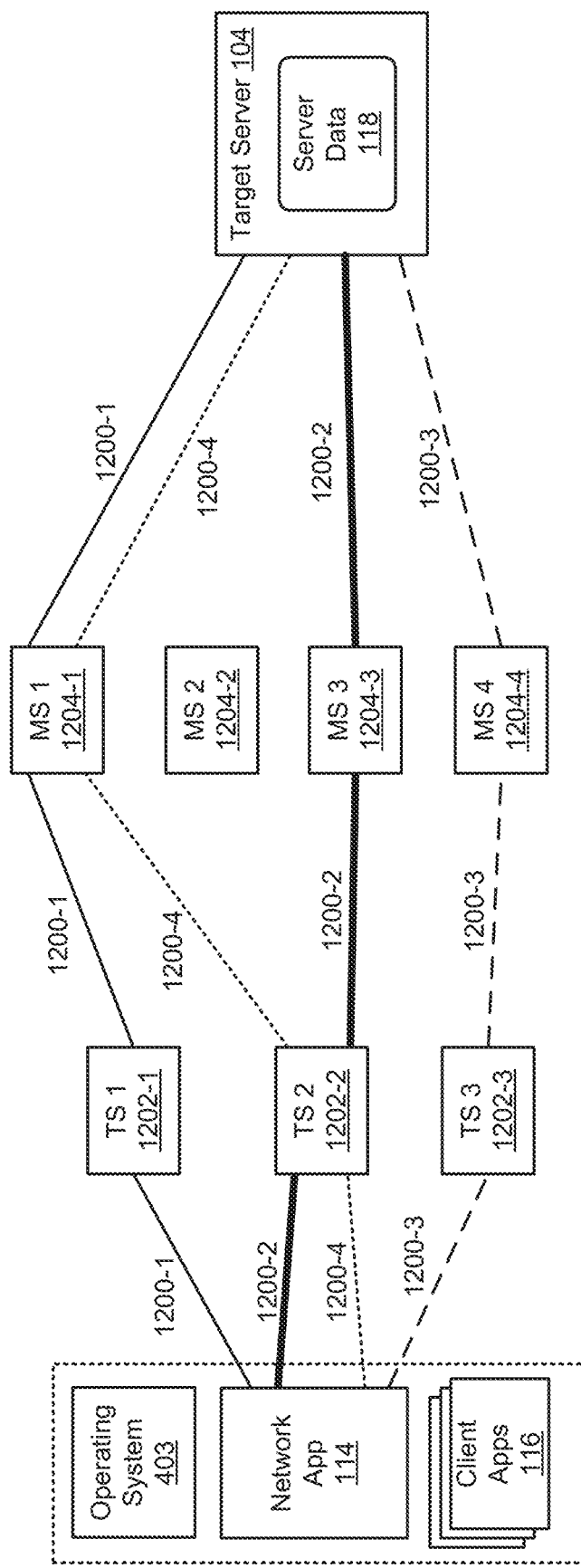
FIG. 12 is a network diagram that illustrates four request/response cycles.

FIG. 12 is a network diagram that illustrates 4 request/response cycles 1200-1, 1200-2, 1200-3, 1200-4 (collectively request/response cycles 1200). As described herein, the client communication module 406 and the transport communication module 510 may select (e.g., randomly select) different servers for sending each request. Accordingly, the request/response cycles 1200 take a variety of paths through the network.

The network in FIG. 12 includes three transport servers 1202-1, 1202-2, 1202-3 and four masking servers 1204-1,

1204-2, 1204-3, 1204-4. The signal server(s) and control server are not illustrated for the server network in FIG. 12. Example request/response cycle 1200-1 uses transport server 1202-1 and masking server 1204-1. Example request/response cycle 1200-2 uses transport server 1202-2 and masking server 1204-3. Example request/response cycle 1200-3 uses transport server 1202-3 and masking server 1204-4. Example request/response cycle 1200-4 uses transport server 1202-2 and masking server 1204-1. The number of transport servers, masking servers, and signal servers may vary, depending on the implementation (e.g., according to the network administrator). In some implementations, the number of servers (e.g., signal servers) available on the server network 102 may also change over time after the network administrator has initially set up the server network 102. For example, the number of client signal servers may vary, depending on the number of users that enable the signal server functionality on the client devices.

FIGS. 13-14 describe how the signal servers can receive client reports from client devices and update one another in order to maintain accurate transport server lists and signal server lists. FIG. 13 illustrates two signal servers 1302-1, 1302-2. It may be assumed that the signal servers 1302-1, 1302-2 initially include the same transport server lists 1308-1, 1308-2 and signal server lists 1310-1, 1310-2.

In FIG. 13, client device 1300-1 detects an error with the server network. In FIG. 13, it can be assumed that the error detected by client device 1300-1 is an unavailable transport server. At 1301, in response to detecting the error, the client device 1300 sends a client report to the signal server 1302-1 (e.g., signal server communication module 1304-1) indicating that a transport server is unavailable to the client device 1300-1. The signal server communication module 1304-1 receives the client report and updates the transport server list 1302-1 based on the client report.

A signal server can update the transport server list and the signal server list based on client reports received from client devices and signal server updates received from other signal servers. The signal servers may update the transport server list and signal server list in a variety of ways. In some implementations, the signal server may mark the servers (e.g., IP address) with server list metadata based on the client reports and signal server updates. The server metadata may include information that describes the condition reported (e.g., an error code) for the servers along with a count of how many times the condition was reported. In some implementations, the server metadata may also include geolocation-specific data, such as the geolocation of the client device that generated the client report. In these implementations, the signal server may determine that a transport/signal server is unavailable to devices/servers from a particular geolocation, such as a particular country. For example, the signal server may determine that a transport/signal server is unavailable when greater than a threshold number/fraction of client reports are received from a specific geolocation (e.g., specific country).

The signal servers can take a variety of actions with respect to updating client devices and updating other signal servers based on the server list metadata. In one example, the signal server may take various actions based on the geolocation metadata, such as omitting a transport/signal server from a list update based on geolocation of the client device (e.g., based on a threshold number/fraction of error reports for a specific geolocation). In some cases, depending on the number of different client reports for different geolocations, the signal server may omit the transport server from all updates and mark the server as unavailable. The network administrator may identify the transport server and fix or remove the transport server from operation in response to the signal server list metadata.

The criteria for determining whether to filter out transport servers and/or signal servers in list updates to the client device may be configured by the network administrator. For example, the network application, as distributed, may include a configuration file that includes the criteria. Additionally, or alternatively, the network administrator may use the control server to set/update the criteria for filtering out the transport servers and/or signal servers. Example criteria may include a number of reports and country of origin. For example, the signal server may be configured to filter out transport/signal server IP addresses to clients in a specific geolocation if there are a threshold number of unavailable reports associated with the transport/signal server IP address for the corresponding specific geolocation. As another example, the signal server may be configured to filter out a transport server IP address to all client devices in different geolocations if there are a threshold number of error reports for a threshold number of geolocations.

At 1303, the signal server 1302-1 (e.g., the signal server update module 1306-1) sends a signal server update to the signal server 1302-2 (e.g., the signal server update module 1306-2). The signal server update can include data for updating the transport server list 1308-2 of signal server 1302-2. For example, the signal server update can include the amended transport server list and signal server list for the signal server 1302-2 to integrate with the transport server list 1308-2 and signal server list 1310-2. In some implementations, the signal server update may include a timestamp that indicates when the update was generated. In these implementations, the signal server that receives the signal server update may update any data that is not current (e.g., as indicated by the timestamp). The signal servers may incrementally update data (e.g., changes in data) according to the timestamps associated with the signal server updates.

At 1305, the client device 1300-2 sends an update request to signal server 1302-2. The signal server communication module 1304-2 sends a list update at 1307 to the client device 1300-2 that includes an updated transport server list. The client device 1300-2 can then use the updated transport server list and signal server list until the client device 1300-2 identifies another error in the server network and/or receives a new list update.

Signal servers can update their respective transport server lists and signal server lists by communicating with one another in a variety of ways. In some implementations, signal servers may be configured to directly communicate with one another. In this example, each signal server may have a list of other signal servers with which it can communicate. The list of other signal servers may include one or more signal servers (e.g., all signal servers). In some implementations, signal servers may be configured to update one another via a push service, where a signal server pushes updates to a plurality of other signal servers. In some implementations, a signal server may send an update in response to newly available information (e.g., newly reported server errors). In some implementations, a signal server may be configured to update over time at set intervals, such as periodic intervals or after a period of time has passed after a recent update. Each of the signal servers can be configured to update one another in one or more ways (e.g., direct communication, peer-to-peer, and/or push). The network administrator can set the updating schemes used by each signal server using the control server.

In some implementations, a signal server may detect an error with another signal server during update communications. For example, a signal server may determine that another signal server is non-responsive or is subject to another error. Additionally, in some implementations, signal servers may be configured to ping one another (e.g., periodically or according to set times) to determine whether other signal servers are responsive. The signal servers may update one another as to their status based on any errors during updates and/or other communications.

FIG. 14 illustrates a method describing signal server updates with respect to FIG. 13. In block 1400, a first signal server 1302-1 receives a client report from a first client device 1300-1. In block 1402, the first signal server 1302-1 updates the first transport server list 1308-1 and/or the first signal server list 1310-1 based on the client report. In block 1404, the first signal server 1302-1 then sends a signal server update to the second signal server 1302-2 indicating the updates made based on the client report. In block 1406, the second signal server 1302-2 updates the second transport server list 1308-2 and/or the second signal server list 1310-2 based on the received signal server update. In block 1408, the second signal server 1302-2 receives a list update request from a second client device 1300-2. In block 1410, the second signal server 1302-2 sends the updated second transport server list and the updated second signal server list to the second client device 1300-2 in response to the received list update request.

FIGS. 15-16 describe client devices that include signal server modules that allow the client devices to act as a signal server. In FIG. 15, the client device 1500 includes a network application 1502 that includes a signal server module 1504. The signal server module 1504 allows the client device 1500 to act as a signal server. A client device acting as a signal server may be referred to herein as a "client signal server." In some implementations, the user can decide whether to operate a client signal server on the client device 1500. For example, the user can interact with a menu GUI or other GUI element to activate/deactivate the client signal server.

The signal server module 1504 may include a signal server communication module 1506 and a signal server update module 1508. The signal server communication module 1506 and the signal server update module 1508 may operate in the same/similar manner as described herein with respect to the signal server communication modules 518, 1304-1, 1304-2 and the signal server update modules 520, 1306-1, 1306-2 included on the signal servers 106, 1302. The signal server communication module 1506 and the signal server update module 1508 may use the signal server list 402-1 and the transport server list 402-2 included in the client list 402.

The signal server communication module 1506 can receive client reports from client devices and update the client list 402 based on the client reports. The signal server communication module 1506 can also receive list update requests from client devices. The signal server communication module 1506 can return list updates to the client devices that are based on the client list 402.

The signal server update module 1508 can update other signal servers in the manner described herein. For example, the signal server update module 1508 may update other signal servers 106 and client signal servers using outgoing signal server updates. The signal server update module 1508 may also receive incoming signal server updates from other signal servers and client signal servers. The signal server update module 1508 may update the client list 402 in response to received signal server updates.

Although the signal server module 1504 can be implemented as part of the network application 1502 as illustrated in FIG. 15, in other implementations, the signal server module 1504 can be included in another application. In some implementations, the signal server module 1504 may be implemented as a stand-alone signal server application on a client device.

The client signal servers may be configured to notify other signal servers (e.g., client or otherwise) when the client signal servers come online (e.g., are available). For example, a newly available client signal server may update other signal servers when the client signal server is available. The availability of the newly available client signal server may propagate through the network as described herein (e.g., via signal server updates). In some implementations, the client signal servers may indicate to other signal servers when the client signal servers become unavailable. In other implementations, unavailability of a recently available client signal server may propagate through the network via error reports (e.g., client or signal server error reports).

FIG. 16 illustrates an example client device 1500 in communication with the server network 102 and a plurality of client signal servers 1600. The network application 1502 on the client device 1500 may include the signal server module 1504. The client device 1500 and the client signal servers 1600 may communicate with the target server 104 via the transport servers 108 and masking servers 110.

In FIG. 16, the client device 1500 may send list update requests and client reports to the signal servers 106 and/or the client signal servers 1600. The client device 1500 may also receive list updates and signal server updates from the signal servers 106 and/or the client signal servers 1600. Additionally, the client device 1500 may generate signal server updates for the signal servers 106 and/or the client signal servers 1600. Accordingly, in some cases, the same client device that communicates with the target server may also provide list updates to other client devices in a client signal server capacity. Additionally, the client device may also receive client reports, send signal server updates, and update its own client list in response to incoming signal server updates.

A client device 100 described herein can execute computer-executable instructions in memory. For example, a client device 100 can include one or more processing units that can execute the network application 114, an operating system, a web browser application, and additional applications, all of which can be implemented as computer-executable instructions. A client device 100 can include one or more computer-readable mediums (e.g., random-access memory, hard disk drives, solid state memory drives, flash memory drives, etc.) that can store any suitable data that is utilized by the operating system and/or any of the applications that are executed by the client device 100.

Modules and data stores included in the server network 102 and client devices 100 represent features that may be included in the server network 102 and client devices 100 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the server network 102 may include one or more computing devices (e.g., node computing/server devices) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the server network 102 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices may reside within a single machine at a single geographic location in some examples. In other examples, the one or more computing devices may reside within multiple machines at a single geographic location. In still other examples, the one or more computing devices may be distributed across a number of geographic locations.

What is claimed is:

1. A system comprising:
   a plurality of masking server devices;
   a plurality of transport server devices, each configured to store a masking server list that includes masking server Internet Protocol (IP) addresses for the plurality of masking server devices; and
   a plurality of signal server devices, each signal server device configured to:
      store a transport server list that includes transport server IP addresses for the plurality of transport server devices;
      receive an update request from a client device; and
      send the transport server IP addresses to the client device in response to the update request,
   wherein each transport server device is configured to receive a request data payload for a destination target server device from the client device, select a masking server device from the masking server list, and send the request data payload to the selected masking server device,
   wherein the selected masking server device is configured to send the request data payload to the destination target server device, receive a response data payload from the destination target server device, and send the response data payload to a receiving transport server device from which the request data payload was received, wherein the receiving transport server device that receives the response data payload is configured to send the response data payload to the client device.

2. The system of claim 1, wherein each of the signal server devices is configured to:
   receive a client error report from the client device indicating that one or more transport server devices are unavailable to the client device; and
   update the transport server list based on the received client error report.

3. The system of claim 2, wherein the update request is a first update request, and wherein each of the signal server devices is configured to:

receive a second update request from the client device subsequent to the first update request; and send the updated transport server list to the client device in response to the second update request.

4. The system of claim 2, wherein the client error report indicates the geolocation of the client device and includes IP addresses for the one or more transport server devices that are unavailable to the client device.

5. The system of claim 4, wherein the update request is a first update request, wherein the client device is a first client device, and wherein each of the signal server devices is configured to:

receive a second update request from a second client device;

generate a new list of transport server IP addresses by filtering out transport server IP addresses from the updated transport server list based on the geolocation of the second client device; and send the new list of transport server IP addresses to the second client device.

6. The system of claim 1, wherein each of the signal server devices is configured to:

store a signal server list that includes signal server IP addresses for the plurality of signal server devices; and send the signal server IP addresses to the client device in response to the received update request.

7. The system of claim 6, wherein each of the signal server devices is configured to:

receive a client error report from the client device indicating that one or more signal server devices are unavailable to the client device; and update the signal server list based on the received client error report.

8. The system of claim 7, wherein each of the signal server devices is configured to send the updated signal server list to other signal server devices.

9. The system of claim 1, wherein each transport server device is configured to:

determine that the selected masking server device is unavailable;

select a different masking server device from the masking server list to receive the request data payload; and send the request data payload to the different masking server device.

10. The system of claim 9, wherein each transport server device is configured to randomly select the different masking server device from the masking server list.

11. The system of claim 9, wherein each transport server device is configured to send an error report to the client device indicating that the selected masking server device is unavailable.

12. The system of claim 1, wherein one or more of the signal server devices are configured to store a signal server list that includes signal server IP addresses for the plurality of signal server devices, and wherein one of the signal server IP addresses is the IP address of the client device.

13. The system of claim 12, wherein the one or more signal server devices are configured to receive updates to the signal server IP addresses in the signal server list from the client device.

14. The system of claim 12, wherein the one or more signal server devices are configured to receive updates to the transport server IP addresses in the transport server list from the client device.

15. The system of claim 1, further comprising a control server device, wherein each of the signal server devices is configured to store a signal server list that includes signal server IP addresses for the plurality of signal server devices, and wherein the control server device is configured to:

update the masking server IP addresses included in the masking server lists;

update the transport server IP addresses included in the transport server lists; and update the signal server IP addresses included in the signal server lists.

16. The system of claim 1, wherein each transport server device does not include transport server IP addresses for other transport server devices.

17. The system of claim 1, wherein each masking server device does not include masking server IP addresses for other masking server devices.

18. A system comprising:

a plurality of masking server devices;

a plurality of transport server devices, each configured to store a masking server list that includes masking server Internet Protocol (IP) addresses for the plurality of masking server devices; and a non-transitory computer-readable medium comprising computer-executable instructions configured to execute on a plurality of user-device based client signal servers, wherein the instructions are configured to cause each client signal server to:

store a transport server list that includes transport server IP addresses for the plurality of transport server devices;

receive an update request from a client device; and send the transport server IP addresses to the client device in response to the update request, wherein each transport server device is configured to receive a request data payload for a destination target server device from the client device, select a masking server device from the masking server list, and send the request data payload to the selected masking server device, wherein the selected masking server device is configured to send the request data payload to the destination target server device, receive a response data payload from the destination target server device, and send the response data payload to a receiving transport server device from which the request data payload was received, wherein the receiving transport server device that receives the response data payload is configured to send the response data payload to the client device.

19. The system of claim 18, wherein the instructions are configured to cause each of the client signal servers to:

receive a client error report from the client device indicating that one or more transport server devices are unavailable to the client device; and update the transport server list based on the received client error report.

20. The system of claim 19, wherein the update request is a first update request, and wherein each of the client signal servers is configured to:

receive a second update request from the client device subsequent to the first update request; and send the updated transport server list to the client device in response to the second update request.

21. The system of claim 19, wherein the client error report indicates the geolocation of the client device and includes IP addresses for the one or more transport server devices that are unavailable to the client device.

22. The system of claim 21, wherein the update request is a first update request, wherein the client device is a first client device, and wherein each of the client signal servers is configured to:
- receive a second update request from a second client device;
- generate a new list of transport server IP addresses by filtering out transport server IP addresses from the updated transport server list based on the geolocation of the second client device; and
- send the new list of transport server IP addresses to the second client device.

23. The system of claim 18, wherein the instructions are configured to cause each of the client signal servers to:
- store a signal server list that includes signal server IP addresses for the plurality of client signal servers; and
- send the signal server IP addresses to the client device in response to the received update request.

24. The system of claim 23, wherein each of the client signal servers is configured to:
- receive a client error report from the client device indicating that one or more client signal servers are unavailable to the client device; and
- update the signal server list based on the received client error report.

25. The system of claim 24, wherein each of the client signal servers is configured to send the updated signal server list to other client signal servers.

26. The system of claim 18, wherein each transport server device is configured to:
- determine that the selected masking server device is unavailable;
- select a different masking server device from the masking server list to receive the request data payload; and
- send the request data payload to the different masking server device.

27. The system of claim 26, wherein each transport server device is configured to randomly select the different masking server device from the masking server list.

28. The system of claim 26, wherein each transport server device is configured to send an error report to the client device indicating that the selected masking server device is unavailable.

29. The system of claim 18, wherein the instructions are configured to cause one or more of the client signal servers to store a signal server list that includes signal server IP addresses for the plurality of client signal servers, and wherein one of the signal server IP addresses is the IP address of the client device.

30. The system of claim 29, wherein the one or more client signal servers are configured to receive updates to the signal server IP addresses in the signal server list from the client device.

31. The system of claim 29, wherein the one or more client signal servers are configured to receive updates to the transport server IP addresses in the transport server list from the client device.

32. The system of claim 18, further comprising a control server device, wherein each of the client signal servers is configured to store a signal server list that includes signal server IP addresses for the plurality of client signal servers, and wherein the control server device is configured to:
- update the masking server IP addresses included in the masking server lists;
- update the transport server IP addresses included in the transport server lists; and
- update the signal server IP addresses included in the signal server lists.

33. The system of claim 18, wherein each transport server device does not include transport server IP addresses for other transport server devices.

34. The system of claim 18, wherein each masking server device does not include masking server IP addresses for other masking server devices.

\* \* \* \* \*